(12) United States Patent
Becker

(10) Patent No.: US 12,296,664 B2
(45) Date of Patent: May 13, 2025

(54) TONNEAU COVER RELEASE SYSTEM

(71) Applicant: Extang Corporation, Ann Arbor, MI (US)

(72) Inventor: Anthony Becker, Saline, MI (US)

(73) Assignee: Extang Corporation, Ann Arbor, MI (US)

( * ) Notice: Subject to any disclaimer, the term of this patent is extended or adjusted under 35 U.S.C. 154(b) by 348 days.

(21) Appl. No.: 17/977,767

(22) Filed: Oct. 31, 2022

(65) Prior Publication Data

US 2023/0226895 A1    Jul. 20, 2023

Related U.S. Application Data

(60) Provisional application No. 63/301,124, filed on Jan. 20, 2022.

(51) Int. Cl.
 *B60J 7/19*  (2006.01)
 *B60J 7/14*  (2006.01)
(52) U.S. Cl.
 CPC ............... *B60J 7/198* (2013.01); *B60J 7/141* (2013.01)
(58) Field of Classification Search
 CPC ....... B60J 7/14; B60J 7/141; B60J 7/16; B60J 7/1607; B60J 7/185; B60J 7/198; E05F 15/657
 USPC ............ 296/100.01, 100.02, 100.03, 100.04, 296/100.07
 See application file for complete search history.

(56) References Cited

U.S. PATENT DOCUMENTS

| | | | | |
|---|---|---|---|---|
| 4,795,206 | A | * | 1/1989 | Adams ................. B60J 5/14 296/100.09 |
| 5,040,843 | A | * | 8/1991 | Russell ................. E06B 9/581 296/100.09 |
| 5,350,213 | A | * | 9/1994 | Bernardo ............... B60J 7/041 296/100.09 |
| 10,189,340 | B2 | | 1/2019 | Schmeichel et al. |
| 10,525,804 | B2 | * | 1/2020 | Pompili ............... B60J 7/198 |
| 10,988,009 | B1 | * | 4/2021 | Weng ................. B60J 7/141 |
| 11,007,856 | B1 | * | 5/2021 | Fu ..................... B60J 7/198 |
| 11,097,605 | B2 | * | 8/2021 | Mahler ............... B62D 33/046 |
| 11,142,050 | B2 | * | 10/2021 | Pompili ............... B60J 7/198 |
| 11,884,145 | B2 | * | 1/2024 | Pompili ............... B60R 5/048 |
| 2016/0236552 | A1 | * | 8/2016 | Hannan ............... B60J 7/068 |
| 2021/0285266 | A1 | | 9/2021 | Tectum |
| 2023/0226895 | A1 | | 7/2023 | Becker |

OTHER PUBLICATIONS

Co-pending U.S. Appl. No. 17/496,290, filed Oct. 7, 2021.
(Continued)

*Primary Examiner* — Jason S Daniels

(57) ABSTRACT

A release system of a tonneau cover, the release system comprising: (a) a spring latch, wherein the spring latch is located adjacent to or at least partially within an opening of a side rail of the tonneau cover to engage a drive system of the tonneau cover located within the side rail; and (b) a release latch connected to the spring latch by a release cable so that articulation of the release latch moves the spring latch between an engaged position, where the spring latch engages the drive system, and a disengaged position, where the spring latch is free of engagement with the drive system and the tonneau cover is free to move along the side rail independently of the drive system.

17 Claims, 11 Drawing Sheets

(56) References Cited

OTHER PUBLICATIONS

Co-pending U.S. Appl. No. 16/953,839, filed Nov. 20, 2020 (Published as US2021/0285266).
Co-pending U.S. Appl. No. 17/953,952, filed Sep. 27, 2022.
Canadian Office Action dated May 21, 2024, for Canadian Application 3,181,884.

* cited by examiner

TONNEAU COVER RELEASE SYSTEM

CROSS-REFERENCE TO RELATED APPLICATIONS

This application claims benefit to U.S. Provisional Application No. 63/301,124, filed on Jan. 20, 2022, all of which is incorporated herein in its entirety for all purposes.

FIELD

The present teachings generally relate to a tonneau cover, and more particularly, to release system for releasing a powered tonneau cover.

BACKGROUND

Tonneau systems are typically used to cover and protect a cargo bed or unoccupied portion of a vehicle from environmental degradation. Typical tonneau systems include a plurality of structural members that are attached directly to the vehicle to form a frame. A cover is then secured to the frame, preventing moisture, debris, or unwanted objects from entering the cargo bed or unoccupied portion and damaging cargo or the vehicle itself. The tonneau system may include a rigid frame design, such that when fully assembled and attached to the vehicle, the frame creates a unitary structure. The tonneau system may also include one or more rails that movably secure the cover so that the cover may be retracted by rolling or folding the cover onto itself to uncover only a portion of the cargo bed or unoccupied portion.

It may often be desirable to easily open and close a cover to access the cargo bed or unoccupied portion of a vehicle. In an effort to aid with opening and closing of the tonneau cover, many tonneau systems include a motor that opens and closes the cover automatically based upon user input (e.g., a button, a fob, etc.). However, while automatic tonneau systems increase ease of opening and closing the tonneau cover, a user may be unable to open and/or close the cover when the motor is not operational. For example, a user may be unable to open a closed cover if the tonneau system is without power to operate the motor, or if the motor has failed or otherwise been rendered defective. Thus, a user may be required to service the vehicle and repair the tonneau system before the tonneau cover may be opened. Similarly, if a user were able to release the motorized tonneau cover using a manual release, it may be difficult for the user to realign the tonneau cover with the drive system to reengage.

Examples of tonneau systems and manual release systems may be found in U.S. patent application Ser. No. 17/496,290, filed on Oct. 7, 2021, and U.S. Provisional Patent Application No. 63/271,925, filed on Oct. 26, 2021, both of which are incorporated herein in their entirety for all purposes. It would be attractive to have a tonneau system with motorized operation that includes manual accessibility. What is needed is a motorized tonneau cover with the ability to manually extend and retract the cover. It would also be attractive to have a motorized tonneau system with a mechanical release. What is needed is a motorized tonneau system having a mechanical disconnect system in communication with the drive system of the tonneau cover. Additionally, it would be attractive to have the aforementioned disconnect system be easily reengaged to the drive system. Thus, what is needed is a disconnect system that easily realigns with the drive system for proper connection.

SUMMARY

The present teachings meet one or more of the present needs by providing a release system of a tonneau cover, the release system comprising: (a) a spring latch, wherein the spring latch is located adjacent to or at least partially within an opening of a side rail of the tonneau cover to engage a drive system of the tonneau cover located within the side rail; and (b) a release latch connected to the spring latch by a release cable so that articulation of the release latch moves the spring latch between an engaged position, where the spring latch engages the drive system, and a disengaged position, where the spring latch is free of engagement with the drive system and the tonneau cover is free to move along the side rail independently of the drive system.

The spring latch and the release latch may both be secured to a slat of the tonneau cover. The release latch may be positioned centrally along a length of the slat and the spring latch may be located near an end of the slat. The slat may be a tail slat. The spring latch may include a movable pin that engages a carrier of the drive system, whereby the carrier may be secured to a drive cable routed through the side rail. The pin of the spring latch may be positioned within a hole of the carrier in the engaged position and the pin of the spring latch may be retracted from the hole of the carrier in the disengaged position.

Additionally, the spring latch may comprise: (a) a housing that secures the spring latch to a slat of the tonneau cover; (b) a block movably positioned within a cavity of the housing, wherein the pin is secured to the block so that movement of the block also moves the pin; and (c) an arm connected to the release latch by the release cable, wherein movement of the arm is driven by articulation of the release latch and movement of the arm moves the block. The arm may include a finger that engages a lip of the block so that movement of the arm also moves the block. The spring latch may include a biasing member positioned with the cavity of the house that may be compressed by the block in the disengaged position. The biasing member may bias the block and the pin towards the drive system of the tonneau cover.

The present teachings may meet one or more of the present needs by providing a release latch which may comprise: (a) a casing secured to a slat of the tonneau cover; (b) a base plate positioned at least partially within the casing; (c) a pull arm extending from the base plate and at least partially enclosed by the casing, wherein the pull arm is connected to the release cable; and (d) a movable handle, wherein articulation of the handle moves the pull arm to move the spring latch between the engaged position and the disengaged position.

The articulation of the handle may move a link along a track of the base plate, and the link may be connected to the pull arm so that movement of the link causes movement of the pull arm. The pull arm may move away from the base plate to move the spring latch into the engaged position. The pull arm may move towards the base plate to move the spring latch to the disengaged position. The pull arms may be guided along grooves of the base plate.

The present teachings may also meet one or more of the present teachings by providing a release system of a tonneau cover, comprising: (a) a spring latch adapted to engage a drive system of the tonneau cover, the spring latch comprising: (1) a housing; (2) a block movably positioned within a cavity of the housing; (3) a pin secured to the block so that movement of the block also moves the pin, wherein the pin engages a carrier of the drive system, whereby the carrier is secured to a drive cable of the drive system; (4) an arm connected to the release latch by the release cable, wherein movement of the arm is driven by articulation of the release latch and movement of the arm moves the block; and (b) a release latch connected to the spring latch by a release cable, the release latch comprising: (1) a pull arm connected to the release cable; and (2) a movable handle, wherein articulation of the handle moves the pull arm to in turn move the spring latch between an engaged position, where the pin engages the carrier, and a disengaged position, where the pin is free of engagement with the carrier and the tonneau cover is free to move along the side rail independently of the drive system.

The articulation of the handle may move a link connected to the pull arm so that movement of the link causes movement of the pull arm. The spring latch and the release latch may both be secured to a tail slat of the tonneau cover. The drive cable may be routed through a side rail that supports the tonneau cover. The carrier may include one or more tapered surfaces to guide the pin to the engaged position where the pin is located in a hole of the carrier.

DETAILED DESCRIPTION

Figure 1:
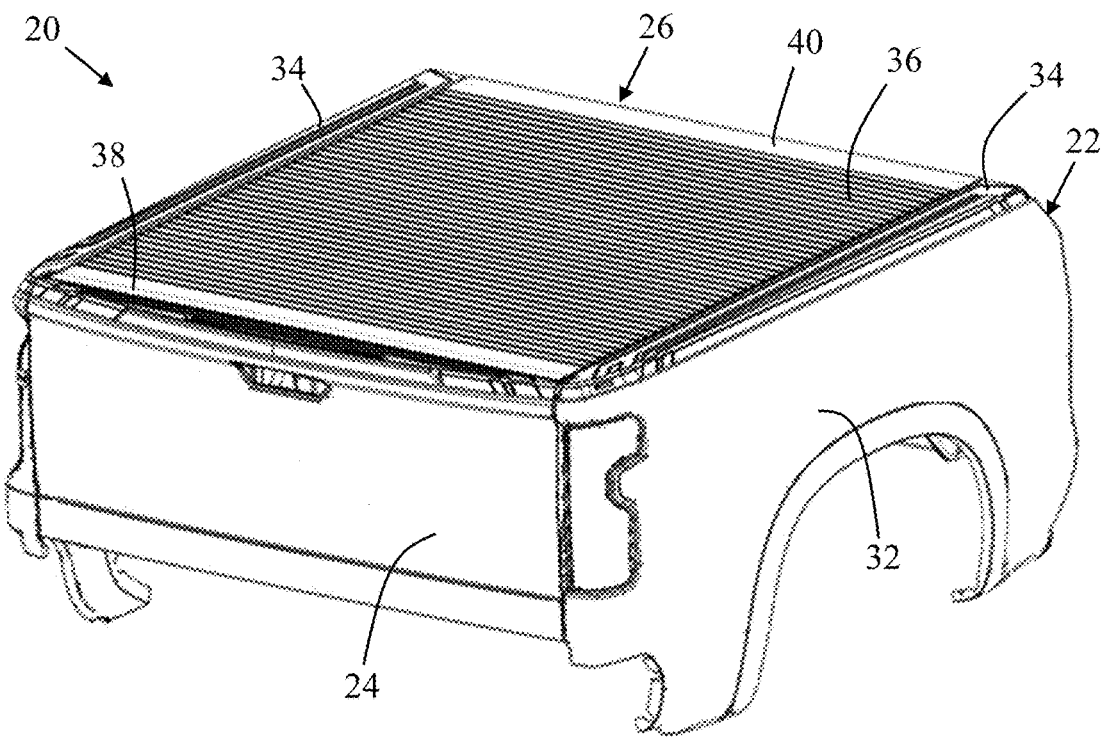
FIG. 1 is a perspective view of a cargo box of a vehicle having a tonneau cover in a closed or extended position.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference in their entirety for all purposes. Other combinations are also possible as will be gleaned from the following claims, which are also hereby incorporated by reference in their entirety into this written description.

The teachings herein generally relate to a vehicle and a system for a vehicle. The vehicle may be any type of automobile, such as a car, truck, SUV, commercial vehicle, or a combination thereof. The vehicle may include a system integrating one or more accessories into the vehicle. The accessories may be assembly as part of the vehicle by the Original Equipment Manufacturer (OEM), may be provided as a secondary aftermarket component, or a combination thereof. The components may include one or more lights, one or more latches, one or more mechanical disconnects, one or more actuators, one or more mirrors, one or more doors, one or more interior components, one or more exterior components, or a combination thereof.

The components may be located near or along a cargo box of the vehicle. The cargo box may be defined as a storage portion of the vehicle adjacent to a cabin of the vehicle. The cargo box may be partially enclosed, fully enclosed, or both. The cargo box may include one or more openings, one or more doors, or a combination thereof. The cargo box may be formed from one or more side rails, one or more fenders, one or more panels, or a combination thereof. The side rails may extend parallel to each other and may be further enclosed by the fenders, panels, or both.

The cargo box may include a tailgate. The tailgate may function to at least partially enclose the cargo box. The tailgate may function as an access point into the cargo box. The tailgate may be considered a component or accessory of the cargo box. The tailgate may be moveable between an open position and a closed position. The open position may be when the tailgate is substantially parallel to the ground and provides an open access point into the cargo box.

The closed position may be when the tailgate is substantially perpendicular to the ground and substantially encloses at least a portion of the cargo box. The tailgate may also move and/or be secured in one or more positioned between the open position and the closed position. The tailgate may be manually operated by a user or may be actuated by one or more powered actuators. The tailgate may operate with physical user interaction or may be actuated remotely.

The tailgate may be used in conjunction with a tonneau cover. The tonneau cover may function to protect against dirt, debris, water, other contaminants, or a combination thereof from entering an inside of a cargo box. The tonneau cover may be a cover that functions to conceal the inside of the cargo box and/or any contents inside the cargo box. The tonneau cover may be placed over the cargo bed of a vehicle, such as a pickup truck. As such, the tonneau cover may also be considered an accessory of the vehicle.

The tonneau cover may comprise multiple enclosure panels or a single panel. One or more of the panels may be slats. One or more of the slats may be moved or repositioned relative to one another to move the tonneau cover between an open position and a closed position. One or more of the slats may be substantially rigid. One or more of the slats may be substantially flexible but may be stabilized with a rigid frame. One or more of the slats may be interconnected to form the tonneau cover. Thus, the slats may be moved, pivoted, or both independent or simultaneously. The slats may also extend transverse to a length of the cargo box. As such, a plurality of slats may be interconnected to cover the cargo box.

One or more of the slats may include a channel. The channel may function to increase structural integrity of the slats. The channel may function to receive a component of the tonneau cover, such as a latch, disconnect, or other type of interlocking component. The channel may include an opening to receive the one or more components or may be substantially enclosed. The channel may form a U-shape, a V-shape, a C-shape, a D-shape, or a combination thereof. The channel may include one or more flanges projecting inwardly toward each other or away from the channel. The flanges may include a lip or may be substantially planar. The flanges along with one or more portions of the channel may guide a component along the channel in a substantially linear direction along a longitudinal axis of the channel. That is, the flanges and the channel may act as a track to guide the one or more components.

Additionally, the channel may include one or more keyholes. The keyholes may function to receive all or a portion of a component, such as a latch and/or disconnect. The keyholes may provide extended dimensions of the channel to more easily receive the latch and/or disconnect into the channel. The keyholes may be positioned along a perimeter of the channel, near a corner of the channel, or both. The keyholes may be an extension of the channel to form a shape different than the overall shape of the channel.

Some of the panels may be slats while others may be a panel of a different structure. For example, a plurality of interconnected slats may form a portion of the tonneau cover. Additionally, a front and/or rear panel may be located at opposing ends of the interconnected slats. The front and/or rear panel may be configured for pivoting, rotation about a hinge-point, or both while the interconnected slats may be substantially free of pivoting and/or rotation, and the slats may be configured for guidance alongside rails of the cargo box. Similarly, the tonneau cover may include a front panel located proximately to a cab of the vehicle while a tail slat may be positioned proximately to the tailgate of the vehicle. Thus, it may be gleaned from the present teachings that the tonneau cover may provide various functionality within the slats or other panels of the tonneau cover.

The open position of the tonneau cover may be when the tonneau cover, or at least one enclosure panel of the tonneau cover, is free from contacting, engaging, or is spaced apart from: the tailgate, a top edge of the tailgate, the walls of the cargo bed, a top edge or top surface of the one or more walls of the cargo bed, or a combination thereof. The closed or retracted position of the tonneau cover may be when the tonneau cover, or at least one enclosure panel of the tonneau cover, is in contact with, engages, or rests on the tailgate, a top edge or top surface of the tailgate, a top edge or top surface of the one or more walls of the cargo box, or a combination thereof, but applies less force or pressure thereon compared to when the tonneau cover is in the closed or lowered position. Therefore, the tonneau cover may also provide one or more positions where the tonneau cover may be partially open or raised partially closed or lowered, or a combination thereof. For example, a partially opened or partially closed position may be defined as one or more enclosure panels spaced apart from the walls or side rails of the cargo bed while a plurality of interconnected slats remains in contact with the side rails to cover a portion of the cargo box.

The tonneau cover may be electronically actuated between the open position and the close position, or one or more positions therebetween. Electronic actuation of the tonneau cover may be triggered by one or more interactions from the user. These interactions may include, but are not limited to: one or more commands entered into a wireless application (e.g., an application on a mobile device, tablet, computer, etc.); one or more buttons or commands entered on a wireless fob (e.g., a key fob); a user nearing the vehicle within a proximity range that senses the users presence and sends a signal for electronic actuation of the tonneau cover; one or more sensors or buttons along the vehicle physically touched by the user; one or more voice commands; one or more physical motions of the user recognized by one or more sensors and/or cameras along the vehicle; or a combination thereof.

Actuation of the tonneau cover may be completed by one or more motors. The one or more motors may be positioned anywhere along the tonneau cover. The one or more motors may be located within the confines of the cargo box, the vehicle cab, or somewhere therebetween. It is envisioned that the teachings herein may be advantageously integrated into any automated tonneau cover whereby any type of automated drive system is utilized. For example, the drive system may be a drum drive system, a helical cable drive system, or both. The motor may be a brushless motor, an AC or DC motor, a geared and/or stepped motor, or a combination thereof. Examples of drive systems for tonneau covers can be found in U.S. patent application Ser. No. 17/496,290, filed on Oct. 7, 2021, all of which is incorporated herein in its entirety for all purposes.

The tonneau cover may be electronically actuated to retract from the closed position (i.e., a position where the tonneau cover is in contact with the cargo box to enclose the cargo box) to the open position (i.e., a position where the tonneau cover is free of enclosing the cargo box). In the open position, all or a portion of the tonneau cover may be contained within a canister.

The canister may function to house one or more panels, one or more slats, or both of the tonneau cover. The canister may house the panels and/or slats in a fully open position of the tonneau cover, in a semi-open position of the tonneau cover or both. The fully open position may be considered retraction of the tonneau cover (e.g., slats of the tonneau cover) into the canister. Thus, when in such a retracted or open position, the slats may be contained in the canister and free from view. To house the slats and/or panels of the tonneau cover, the canister may include a canister body. The canister body may be enclosed by one or more side panels. However, it should be noted that while a visible canister may be mounted within the cargo box (e.g., near a front of the cargo box closes to a cab of the vehicle), the tonneau cover may also be housed within a bulkhead or false bulkhead located within the cargo box of the vehicle. As such, the canister or a storage compartment of the tonneau cover may include a front panel to facilitate opening and/or closing of the canister or storage compartment.

The front panel may extend across the opposing side walls or side rails of the cargo box. The front panel may be located nearest a cab of the vehicle where the tonneau cover is housed when in an open or retracted position. The front panel may function to pivot between an open position and a closed position. The open position may be defined as a position where the front panel is disconnected from, or space apart from, the side rails, canister opening, bulkhead opening, or a combination thereof. The closed position may be defined as a position where the front panel is in contact with, or engages, the side rails, canister opening, bulkhead opening, or a combination thereof to enclose the canister and/or bulkhead. Thus, it may be gleaned from the present teachings that the front panel may be actuated by one or more actuator assemblies or striker assemblies, such as those found in U.S. patent application Ser. No. 16/953,839, filed on Nov. 20, 2020, all of which is incorporated herein for all purposes.

As discussed above, the tonneau cover may be driven by a drive system having one or more motors. To facilitate movement of the tonneau cover by the one or more motors, one or more cables may be connected to the tonneau cover (e.g., one or more slats) and maintain communication with the one or more motors. The cable may include one or more engaging portions to communicate with the motor. For example, the cable may be a helical cable that facilitates teeth of a motor gear meshing with the cable to advance the cable along the motor gear, thereby moving the tonneau cover. However, it is envisioned that the cable may be any gauge or configuration that may connect to the tonneau cover to move the tonneau cover. For example, the cable may be free of a coil surrounding a core and may instead include one or more divots, channels, barbs, notches, projections, or a combination thereof that engage the teeth of the drive gear and move the tonneau cover. Additionally, the type of cable may also be selected based upon the drive system configuration being utilized (e.g., a gear drive system versus a drum drive system). Similarly, it is also envisioned that the drive cable may be at least partially encapsulated by a casing to protect one or more portions of the cable.

The drive system may move one or more slats along side rails to open and close the tonneau cover. The side rails may function to guide the tonneau cover between the open position and the closed position. The side rails may abut one or more surfaces of the cargo box so that the tonneau cover may be secured to the cargo box. The side rails may include one or more projections, one or more protrusions, or both that mate to a surface of the cargo box. For example, the side rails may include a mounting portion that is positioned substantially parallel to a vertical sidewall of a cargo box so that, when installed, the side rail abuts the sidewall in a substantially flush manner (i.e., the abutment is substantially free of gaps between the mounting portion and the vertical lip). The side rails may abut the sidewall in a manner other than substantially flush. For example, a gap may exist between the side rail and the sidewall, yet the tonneau cover system may still properly function. The side rail may be a unitary piece or may comprise a plurality of components. For example, the side rail may be a single injection-molded piece having a plurality of integrated projections. Alternatively, the side rail may include a body having one or more projections fastened or adhered to a surface of the body.

The side rails may also include an opening. The opening may function to receive an end portion of the slats and/or panels of the tonneau cover. The opening may be formed between an overhang portion of the side rail—that is, a portion of the side rail that overhands an upper surface of the slats and/or panels—and a lower lip. The slats and/or panels may extend into the opening between the lip and the overhand portion to facilitate guidance of the tonneau cover along the side rails. As a result, the overhand portion and/or the lip may extend towards opposing surfaces of the slats and/or panels to prevent moisture and/or debris from entering the opening. As discussed further below, one or more seals along the overhand portion, the lip, or both, may compressibly engage the slats and/or panels to further prevent moisture and/or debris from entering the opening.

The side rail may include a support portion that at least partially forms the opening of the side rail. The support portion may function to contact the slats and/or panels along the side rail. The support portion may include one or more features, such as one or more ribs, that extend from the support portion to support the slats and/or panels. The ribs may project from any angle and extend in any desired direction. However, it is envisioned that the ribs may ensure proper support of the slats and/or panels such that movement of the slats and/or panels is done free of significant friction.

To decrease friction between the slats and/or panels and the supporting portion, the slats and/or panels may include an end cap. The slat end cap may be secured to a terminal end of the slat, such as by securing one or more clips of the slat within holes of the slat. Similarly, the end cap may be secured in another fashion, such as by one or more fasteners extending through the slat into the end cap.

The end cap may function to engage the support portion within the opening of the side rail. The end cap may function to at least partially close the channel of the slat, thereby at least partially containing a component within the channel. The end caps may move along the support portion to open and close the tonneau cover. The end caps may act as a riser to ensure the slats sit above the lip of the opening, thereby more freely allowing the slats to move along the side rails while still maintaining sufficient moisture and/or debris protection for the opening. The end caps may also include one or more intermediary components that engaged the support portion to ensure easy movement of the slats and/or panels along the support portion. For example, the end caps may be secured to the slats and/or panels and include one or more bearings that rotate along the support portion.

As discussed above, the drive system of the tonneau cover may utilize one or more cables connected to the tonneau cover (e.g., connected to slats and/or panels of the tonneau cover) to drive the tonneau cover between the open position and the closed position. To further improve packaging constraints of the tonneau cover, the cable may beneficially be routed through the side rails, thereby fully integrating the drive system within the tonneau cover. That is, the cable may be substantially or entirely hidden from the view of a vehicle user. For example, the side rails may be integrated with bed caps of the cargo box and thus the cables and drive system may also look to be visually integrated with the bed caps of the cargo box. As a result, the tonneau cover may visually look to be an OEM product and not an aftermarket component.

To create such integration, the side rails may include one or more channels to route the cables, wires, other items, or a combination thereof. The channels may be fully or partially enclosed to secure the cables. The channels may extend along a length of the side rails so that the cables may be routed into or through holes along the side rails to connect the cables between the tonneau cover and the drive systems through the side rails. As such, the cables may advantageously not encroach on an interior of the cargo box, thereby optimizing storage space within the cargo box.

While there may be many benefits to an automated or motorized drive system for the tonneau cover, a user may be required in certain circumstances to manually release or otherwise move the tonneau cover to access and/or enclose the cargo box. For example, during a power outage (e.g., a dead battery within the vehicle) or a faulty motor, a user may be required to manually move the tonneau cover to access their cargo box. In such a case, a release system in communication with the drive system may be utilized to manually disconnect the tonneau cover or slats thereof from the drive system.

The release system may function to connect one or more slats of the tonneau cover with the drive system of the tonneau cover. Similarly, the release system may provide a user a mechanical release to disconnect the one or more slats from the drive system. The release system may be secured to one or more slats of the tonneau cover, such as a tail slat closest to the tailgate. The release system may be secured to the slat within one or more channels of the slat. For example, the release system may include one or more latches that are secured within one or more channels. Advantageously, such packaging may conceal most or all of the release system from a line of sight when the tonneau cover is in a closed or partially closed position. However, the release system may still be easily accessible by a user if needed.

To optimize ease of disconnection, a single release system may be integrated into the tonneau cover. As a result, a user may beneficially disconnect one or more latches to disconnect the slats or panels of the tonneau cover from engagement with the drive system. Thus, a user may then manually move the slats or panels along the side rails to open and/or close the tonneau cover. However, when needed, it should also be noted that a plurality of release systems may utilized within a single tonneau cover. For example, a pair of release systems may be located along different slats near opposing ends of the tonneau cover. That is a first release system may release the tail slat of the tonneau cover while a second release system may release the front slat or panel of the tonneau cover.

The release system may be fixedly secured to the slat. However, it is envisioned that the release system may be movably secured to the slat, such as movably guided along the channel of the slat. Such movement may facilitate connection and/or disconnection between the disconnect and the drive system. As such, one or more portions of the release system may be movable while one or more other portions remain stationary.

The release system may include a release latch. The release latch may function to release one or more spring latches from the drive system. The release latch may provide a user interface to release the spring latches. That is the release latch may be in communication with the spring latches so that user interaction with the release latch in turn articulates all or a portion of the spring latches.

The release latch may be positioned anywhere along the tail slat. However, it is envisioned that the release latch may be located near one or more ends of the tail slat, along a central portion of the tail slat, or both. For example, the release latch may be positioned at or near a midpoint along a longitudinal length of the tail slat to be substantially equidistance from opposing spring latches. However, it should be noted that any positioning of the release system components may be acceptable based upon a given application.

The release latch may include a handle. The handle may allow users to grip the release latch, thereby allowing the user to articulate the release latch and thus the spring latches. The handle may protrude from all or a portion of the release latch. The release latch may extend inwardly toward a floor of the cargo box when secured to the tail slat. That is, the release latch may extend a sufficient distance to allow a user to easily grasp the handle and articulate the release latch.

Movement of the handle and thus the release latch may be substantially linear, rotational, vertical, or a combination thereof. That is, the handle may be articulated in one or more axes (e.g., x-axis, y-axis, z-axis) to communicate with the spring latches. For example, the handle may be moved substantially along a single linear track between an engaged position and a disengaged position. Such movement may result in movement of one or more innerworkings of the release latch, thereby communicating with the spring latches. However, the handle may also be configured for rotation instead of, or in addition to, substantially linear movement. As such, the rotary portion of the handle may engage and/or disengage with the spring latches. That is, the implementation of different handles may eliminate the need for some of the components of the release latch. For example, a rotary handle may facilitate tension and/or release along a connecting cable between the spring latches and the release latch. As a result, one or more extension arms of the release latch that may be present in a linear-type handle may not be necessary with the rotary handle.

The handle may also include a handle base. The handle base may function to engage one or more components within the release latch to articulate said components. That is, movement of the handle may move the handle base, which in turn moves one or more additional components (e.g., a release cable of the release system). As the one or more additional components move, the spring latches may also be articulated. The handle base may be located within a base plate or other portion of the release latch.

The handle base may include an engaging portion. The engaging portion may function to engage one or more additional components of the release latch. The engaging portion may be an extension of the handle base or may be formed integrally with the handle base. The engaging portion may include one or more holes to receive a portion of the release system, such as one or more release cables. The engaging portion may also include an anti-rotation feature so that, when the engaging portion engages an additional component of the release latch, movement of the handle may in turn also move the additional component.

For example, the engaging portion may engage a cam of the release latch. The cam may function to at least partial route the release cable into and/or through the base of the handle. The cam may function to aid in articulating the cable during movement of the handle (e.g., rotation, linear movement, etc.). The cam may be secured to the engaging portion by one or more fasteners, one or more clips, or both. The cam may be located around or on the base of the handle. For example, the cam may have an opening or hole that receives the base portion of the handle. The base portion of the handle may be a shaft extending to or through the cam so allow for rotation of the cam relative to the handle. As such, the cam and the handle may move along, or rotate about, the same axis.

The cam may include one or more notches or openings to route the release cable. Such notches or openings may be located anywhere along the cam. However, the notches or openings may align with an opening along the handle (e.g., the base of the handle) so that the cable may extend through the notches or openings into the opening of the handle. As a result, movement of the handle may articulate both the cam and the release cable. It should also be noted that the opening of the handle may be any means for securing or engaging the release cable to ensure that movement of the handle may result in articulation of the release cable.

The handle base may be located within a casing of the release latch. The casing may function to house all or a portion of the components of the release latch. The casing may extend outwardly from the slat when secured to the slat. The casing may form one or more depressions, one or more cavities, one or more channels, one or more cutouts, or a combination thereof to secure the components of the release latch while still providing users the ability to grasp the handle.

The casing may at least partially secure the release latch to the slat. To do so, the casing may include one or more extensions—or feet-that are received within the keyholes of the slat. The feet may include one or more keying portions, such as fingers or clips, that engage the keyholes and maintain connection between the casing and a channel of the slat. However, it is also envisioned that the casing may be fastened directly to the slat or a surface of the slat without securement within a channel.

The handle base may be in communication with a base plate of the release latch. The base plate may include one or more notches, grooves, channels, or a combination thereof to facilitate movement of the handle base relative to the base plate while still at least partially securing the handle base to the base plate, thereby preventing disconnection of the base plate from the handle base. The base plate may secure and/or guide one or more links of the release latch. The base plate may be contained within the casing and/or otherwise secured to the tail slat. As such, the base plate may remain substantially stationary during articulation of the release latch. The base plate may be free of a casing so that the base plate may entirely or partially house one or more components of the release latch within a cavity or channel of the base plate. Thus, the base plate may advantageously be mounted or otherwise positioned within the tail slat free of a secondary casing.

The base plate may include one or more tracks that guide the links. The tracks may function to contain the links in desired areas along the base plate. The tracks may also at least partially dictate a direction of movement of the links to ensure proper articulation of the release system. The tracks may be depressions along a surface of the base plate. The tracks may include one or more cutouts, one or more projections, one or more buttons, or a combination thereof to further engage the links therein. As such, any desired shape and any desired number of tracks may be utilized within the base plate. However, it is envisioned that a pair of tracks may be present to guide opposing articulating portions of the release latch the are in communication with opposing spring latches.

The links of the release latch may function to articulate one or more additional components of the release latch. The links may provide an intermediary moving member between the handle and pull arms of the release latch in communication with the spring latches. The links may be any length or shape. However, it is envisioned that the links may include one or more slots, one or more buttons, or both, to engaged one or more tracks of the handle and/or handle base, one or more slots along the base plate (e.g., located within the tracks of the base plate), one or more buttons of the base plate, one or more buttons of the pull arms, or a combination thereof. The one or more buttons may be defined as a projection from the base plate, handle base, links, pull arms, or a combination thereof that are adapted to communicate with one or more additional components (e.g., links, base plate, handle base, pull arms, etc.).

As mentioned above, the links of the release latch may be in communication with one or more pull arms of the release latch. The pull arms may function to connect the release latch to the spring latches. The pull arms may articulate the spring latches. The pull arms may articulate the spring latches using one or more release cables. The release cables may extend between the pull arms and the spring latches. For example, the release cables may be secured in holes of the pull arms so that, when the pull arm is articulated, the release cable is also articulated, thereby articulating the spring latch.

The pull arms may move from and/or between an engaged position and a disengaged position. The engaged position may be a position where the pull arms extend away from the base plate of the release latch towards the spring latches, thereby allowing the spring latch to engage the drive system. Conversely, the disengaged position may be an opposing position whereby the pull arms are at least partially or fully retracted into or towards the base plate, thereby creating tension of the release cable, which in turn "pulls" the spring latches to disengage the spring latches from the drive system.

The pull arms may be at least partially or fully housed within the base plate and/or casing of the release latch. However, the casing and the base plate may be free of obstructing the pull arms to facilitate movement of the pull arms. As such, the pull arms may be positioned within slots, grooves, cavities, holes, channels, or a combination thereof of the base plate and/or the casing to ensure proper movement of the pull arms. Similarly, the casing may be positioned to be free of obstruction with the pull arms. For example, the casing may be positioned above a plane of the free arms to provide a clearance gap between the casing and the tail slat to allow for movement of the pull arms.

The pull arms may include one or more features such as those found on the links to connect the pull arms to the links. For example, the pull arms may include one or more buttons (e.g., projections) that engage slots of the links, or vice versa. Additionally, it is envisioned that a direction of movement of the links may be similar or different to that of the pull arms. The pull arms and the links may move in a substantially linear direction. The pull arms and the links may move in a substantially rotational direction, curved direction, or both. Similarly, the links may move in a rotational or curved direction to guide substantially linear movement of the pull arms. As such, it may be gleaned that various movement directions may be dictated upon the overall configuration of the release latch, thereby providing for further customization.

Additionally, it should also be noted that while a plurality of links and pull arms have been discussed above, any number of links and/or pull arms may be utilized. For example, a single pull arm may be present in the release latch if only a single spring latch is utilized. Similarly, a plurality of pull arms may be used to articulate one spring latch or a single pull arm may articulate a plurality of spring latches.

As mentioned above, the release latch may be in communication with one or more spring latches to articulate the spring latches between an engaged position and a disengaged position. The engaged position may be considered a position where the spring latch is secured to the drive system to ensure that movement of the tonneau cover is done via the drive system. The disengaged position may be considered a position where the spring latch is disengaged from the drive system to allow independent manual movement of the tonneau cover free of the drive system.

The spring latches may function to directly engage the drive system and connect the tonneau cover to the drive system. The spring latches may function to release the tonneau cover from the drive system. The spring latches may be secured to the tail slat similar to the release latch. As such, the spring latches and the release latch may be secured to the same slat (e.g., the tail slat). However, the spring latches may also be secured to a different slat than the release latch.

The spring latch may include a housing. The housing may function to at least partially contain one or more components of the spring latch. The housing may function to secure the spring latch to the tail slat of the tonneau cover. That is, the housing may be substantially stationary during articulation of the spring latch. The housing may include one or more cavities, one or more openings, one or more channels, one or more slots, or a combination thereof. The housing may include one or more projections, one or more extensions, one or more flanges, or a combination thereof to engage the drive system, one or more slats, or both.

A block of the spring latch may be at least partially positioned within the housing. The block may be configured to move within a cavity and/or channel of the housing. The block may be secured to a pin or other extension to move said pin or extension between an engaged position and a disengaged position that may correlate to the engaged and disengaged positions of the spring latch. The block may be fully contained within the housing so that only the pin or other extension extends from the cavity or channel of the housing. However, the block may in some instances extend from the cavity or channel of the housing when articulated.

The block may be secured to a pin that directly engages the drive system. The pin may function to extend into an opening of the drive system so that the pin prevents movement of the tonneau cover relative to the drive system when in the engaged position. As such, the pin may be configured to articulate based upon movement of the release latch. While a pin is described, any extension or feature that may be in communication with the release system may be secured to the block.

An arm of the spring latch may be in communication with the block. The arm may function to articulate the block and thus the pin to move between the engaged position and the disengaged position. The arm may be in communication with the release latch. For example, the release cable may extend from the release latch and be secured within a hole or otherwise secured to the arm.

The arm may be directly connected to the block. As such, the arm may move simultaneously with the block. However, it is envisioned that the arm may advantageously move the block yet may also move independently in some instances to allow for disengagement between the arm and the block. Similarly, the block may also move the arm in certain directions. For example, a biasing member may bias the block relative to the housing and the arm. When tension on the release cable is released, the block may be biased towards the drive system, thereby also moving the arm towards the drive system. However, when tension is applied to the release cable, the arm may pull the block away from the drive system to once again bias the biasing member (e.g., a spring, coil, compressible member, elastic member, etc.).

The arm may be secured to the block in any desired fashion. The arm and the block may have a male portion and a female portion, respectively, or vice versa. The arm and/or the block may include a projection or lip. For example, the arm may include a finger that contacts a lip of the block. Additionally, as the arm and/or block may articulate, the arm, the block, the housing, or a combination thereof may include one or more stops to dictate an end point and/or beginning point of travel of the arm, the block, or both. Such stops may be a wall, projection, extension, or additional feature of the arm, the block, the housing, or a combination thereof.

The arm may be secured to the block by a spring pin. The spring pin may guide the arm within the block, such as within a cavity and/or a slot of the block. As a result, the spring pin may movably secure the arm to the block to facilitate at least partial independent movement of the arm relative to the block, or vice versa.

For example, the spring pin may secure the arm at least partially within a cavity of the block. The arm may move relative to the block until the spring pin reaches an end point of travel, at which point the spring pin may also engage the block and move the block along with the arm. Such travel may be dictated by a channel or slot that at least partially receives the pin so that the arm and spring pin may move freely within the channel or slot unless an end portion of the channel or slot is abutted by the spring pin.

As the block moves the pin based upon movement of the arm and/or the biasing member, the pin may engage a carriage of the drive system. The carriage may function as an intermediate component between the drive system and the spring latch. The carriage may function as a connection point along the drive cable so that the spring latch may be secured to the drive cable. The carriage may be positioned within the side rail so that movement of the drive cable moves the carriage within the opening of the side rail. For example, the carriage may be positioned at least partially within an upper channel of the side rail within the opening of the side rail to help guide the carriage along a length of the side rail (i.e., in a direction or travel substantially parallel to the drive cable).

The carriage may be integrally formed with the drive cable or may otherwise be connected to the drive cable. The drive cable may include one or more extensions or fasteners that secure the carriage so that the carriage moves simultaneously with the drive cable. Similarly, the carriage may include an opening or other receiving features that receives the pin from the spring latch to move the tonneau covers in conjunction with the carriage and drive system. However, it should also be noted that the carriage may include a male feature that is received within a female feature of the spring latch. For example, the carriage may include a pin that is received within a hole of the spring latch.

The carriage may also include one or more tapered surfaces. The tapered surface may function to provide a ramp for the pin of the spring latches. The tapered surface may facilitate reengagement between the spring latch and the carriage. For example, the tonneau cover may be released from the carriage by retracting the pin from the carriage hole, thereby allowing for the tonneau cover to move freely from the drive system. However, it may be difficult for a user to realign the pin of the spring latch with the hole of carriage to properly reengage the tonneau cover to the drive system. To facilitate proper alignment, a user may release the release latch so that the pin extends to the engaged position prior to actually engaging the carriage. As a result, a user may be able to advantageously slide the tonneau cover along the side rails until the pin reaches the carriage and contacts the carriage. Due to the tapered surfaces, the pin may be slightly retracted or otherwise moved along the surface of the carriage until the pin reaches the hole. Once aligned, the biasing member of the spring latch may bias the pin back into the carriage hole to once again engage the tonneau cover to the carriage. As such, the tapered surfaces may also beneficially prevent the pin of the spring latch from hitting the carriage and being prevented from reaching the hole of the carriage.

Based on the above, it should also be noted that the spring latches and the release latch may be used in conjunction or independently. For example, the release latch may articulate the spring latches, or the release latch may be used separately from the spring latches as described herein. That is, the release latch may be using in various other application with other components or other systems. Similarly, the spring latches may be used with another means of articulating the spring latches. For example, one or more actuators may be used to articulate the spring latches free of the release latch.

Turning now to the figures, FIG. 1 illustrates a cargo box 20 of a vehicle (not shown). The cargo box 22 includes a tonneau cover 26 disposed along an upper surface or edge of the cargo box 22. The tonneau cover 26 may span between opposing bed caps 34 and may be supported by side rails (not shown) connected to, or integrally formed with, the bed caps 34. As shown, the tonneau cover 26 is in a closed or extended position, whereby the tonneau cover 26 includes a plurality of interconnected slats 36 spanning between a tail slat 38 and a front panel 40 to cover an interior of the cargo box 22. Therefore, the tonneau cover 26 along with a tailgate 24 of the cargo box 22 and outer fenders 32 of the cargo box 12 may at least partially or fully enclose the interior of the cargo box 22.

Figure 2:
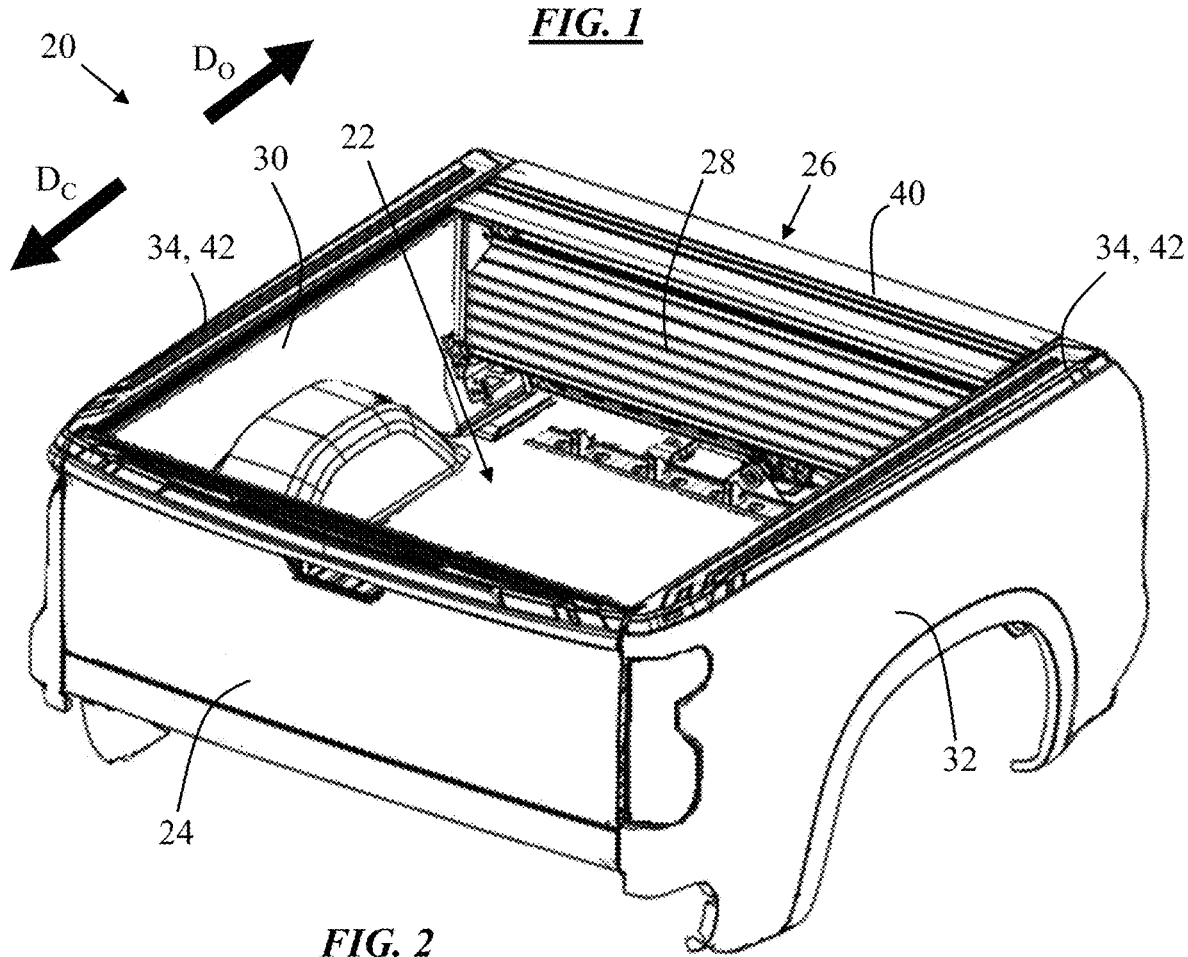
FIG. 2 is a perspective view of the cargo box of FIG. 1 having the tonneau cover in an open or retracted position.

FIG. 2 illustrates the tonneau cover 26 of the cargo box 22 in FIG. 1. As shown, the tonneau cover 26 is in an open or retracted position, whereby all or a portion of the interior of the cargo box 22 is exposed or otherwise accessible. That is, a user may access the interior of the cargo box 22 via the tailgate 24 or along the top edge of the cargo box 22. The tonneau cover 26 may be guided along the side rails 42 recessed from, flush with, or protruding from an upper surface of the bed caps 34. It is envisioned that the tonneau cover 26 may be guided along the side rails 42 by one or more motors (not shown) in communication with the slats of the tonneau cover 26. The one or more motors may drive the tonneau cover 26 in a direction of closing (Dc) to extend the tonneau cover 26 over all or a portion of the cargo box 22. Similarly, the one or more motors may also drive the tonneau cover 26 in a direction of opening (Do) to retract the tonneau cover 26, thereby exposing all or a portion of the interior of the cargo box 22. During retraction, one or more (e.g., two or more, three or more, all, etc.) slats may be retracted into a canister 28 to house the slats when in an open or partially open position. As shown, the canister 28 may beneficially be positioned at least partially beneath the front panel 40 and extend between opposing inside panels 30 of the cargo box 22 to at least partially enclose the canister 28.

Figure 3:
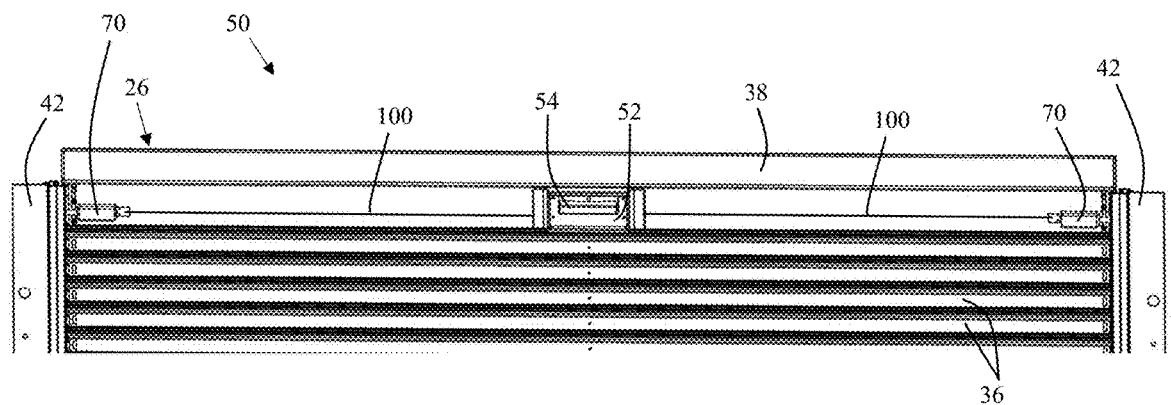
FIG. 3 is a bottom view of a tail slat of a tonneau cover having a release system.

FIG. 3 illustrates a bottom view of a tail slat 38 of a tonneau cover 26. As shown, the tail slat 38 may include a release system 50. The release system 50 may be configured to disengage the tail slat 38, one or more additional slats 36 of the tonneau cover, or both from a drive system of the tonneau cover 26. For example, the tonneau cover 26 may be driven by one or more cables in communication with a motor. As the motor is powered, the one or more cables may be connected to tail slat 38 or additional slats 36 to guide the tonneau cover 26 along opposing side rails 42.

Advantageously, the present teachings may provide a release system 50 to manually disengage the tail slat 38 or additional slats 36 from the drive system. That is, in case of power outages or other deficiencies which render the drive system inoperable, a user may still be able to manually open (e.g., retract), manually close (e.g., extend), or both the tonneau cover 26.

To release the tonneau cover 26 from the drive system, a user may grasp a handle 54 of a release latch 52. The handle 54 may be articulated (see FIGS. 11A and 11B) to articulate opposing spring latches 70 of the release system 50. The spring latches 70 may be positioned near opposing side rails 42 such that movement of the handle 52 may engage and/or disengage a pin of the spring latches 70 from a carrier of the drive system located within the side rails 42, as further discussed below. The release latch 52 may cause engagement and/or disengagement of the pin of the spring latches 70 due to the spring latches 70 being connected to the release latch 52 by release cables 100. As such, movement of the handle 54 of the release latch 52 causes movement of the release cables 100, thereby also moving a portion of the spring latches 70, including the pins therein.

Figure 4:
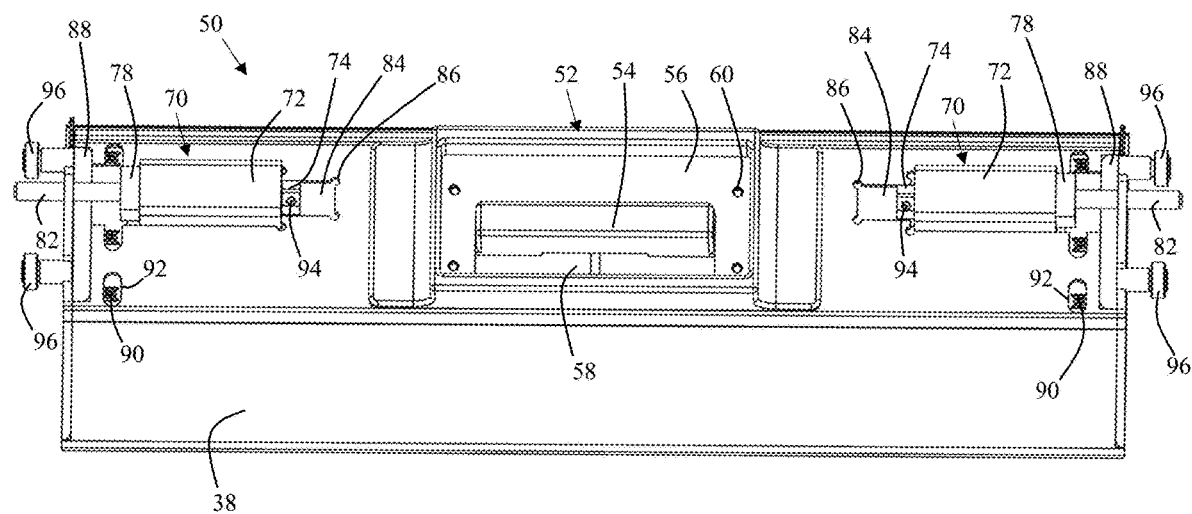
FIG. 4 is a close-up view of a release system of a tonneau cover.

FIG. 4 illustrates a close-up view of a release system 50 of a tonneau cover. For simplicity, the tonneau cover has been omitted from the figure except for a tail slat 38 thereof. The release system 50 may include a release latch 52 in communication with opposing spring latches 70.

The release latch 52 may include a movable handle 54 positioned within a casing 56 of the release latch 52. The handle 54 may be articulated to guide one or more internal components of the release latch 52 along a base plate 58 to engage and/or disengage the spring latches 70 from the drive system of the tonneau cover (not shown). Additionally, it should be noted that the release latch 52 may be secured to the tail slat 38 and at least partially aligned with the opposing spring latches 70. For example, the base plate 58 may be secured to the tail slat 38 and the casing 56 may then be secured to the base plate 58 and/or the tail slat 38 using one or more casing holes 60 adapted to receive a fastener. However, it is also envisioned that the release system 50 may be secure to one or more additional slats other than the tail slat 38.

As shown in FIG. 3, a release cable may be connected between the release latch 52 and the spring latches 70. The release cable (not shown) may extend between the release latch 52 and an arm 74 of the spring latch 70. As a result, the arm 74 may be guided along a channel 84 of the tail slat 38 when the handle 54 of the release latch 52 is articulated. The arm 74 may be in communication with a block 78 of the spring latch 70 so that movement of the arm 74 causes movement of the block 78. As a result, a pin 82 secured to the block 78 may be articulated between an engaged position (i.e., a position where the pin 82 engages the drive system, such as a carriage of the drive system), a disengaged position (i.e., a position where the pin 82 is free of engagement with the drive system, such as a carriage of the drive system), including one or more positions therebetween. As such, it is envisioned that communication between the release latch 52 and the spring latches 70 may be substantially linear movement. However, it should be noted that one or more movements may be in a direction other than linear. Similarly, while the release latch 52 and the spring latches 70 are shown substantially coaxial (e.g., aligned) along a length of the tail slat 38, one or more components of the release system 50 may be offset in certain applications.

As discussed above, the release latch 52 may be secured to the tail slat 38. Similarly, the spring latches 70 may be secured within the channels 84 of the tail slat 38 such that portions of the spring latches 70 may be fixedly secured therein. For example, housings 70 of the spring latches 70 may be fixedly secured within the channels 84, yet the arms 74 of the spring latches 70, the blocks 78 of the spring latches, the pins 82 of the spring latches 70, or a combination thereof may still be movable relative to the tail slat 38 and/or each other. Beneficially, the channels 84 may also include one or more keyholes 86 along a perimeter of the channel 84. Such keyholes 86 may allow for insertion and/or removal of the spring latches 70 if needed.

As shown in further detail below, one or more of the slats of the tonneau cover—including the tail slat 38—may include bearings 96. The bearings 96 may be secured to the tail slat 38 by an end cap 88 and may be adapted to guide the tonneau cover along the opposing side rails (see FIG. 3). The end caps 88 may be secured to the tail slat 38 by one or more clips 90 being received within clip holes 92 of the tail slat 38. That is, the tail slat 38 may be at least partially hollow to receive a portion of the end cap 88, including the one or more clips 90. Advantageously, as shown in FIG. 4, the pin 82 may extend through the end cap 88 to communicate with the drive system of the tonneau cover free of encumbrance from the bearings 96. As such, the release system 50 as disclosed herein may beneficially be adapted for integration into existing tonneau cover packing without significantly modifying one or more existing components of the tonneau cover and/or the drive system thereof.

Figure 5A:
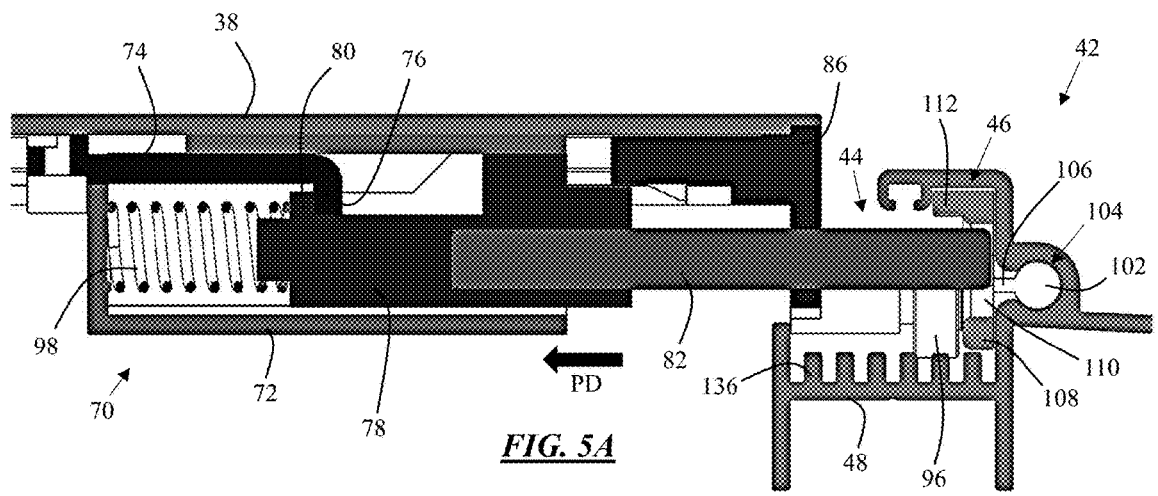
FIG. 5A is a sectional view of a spring latch of a tonneau cover release system in an engaged position.
Figure 5B:
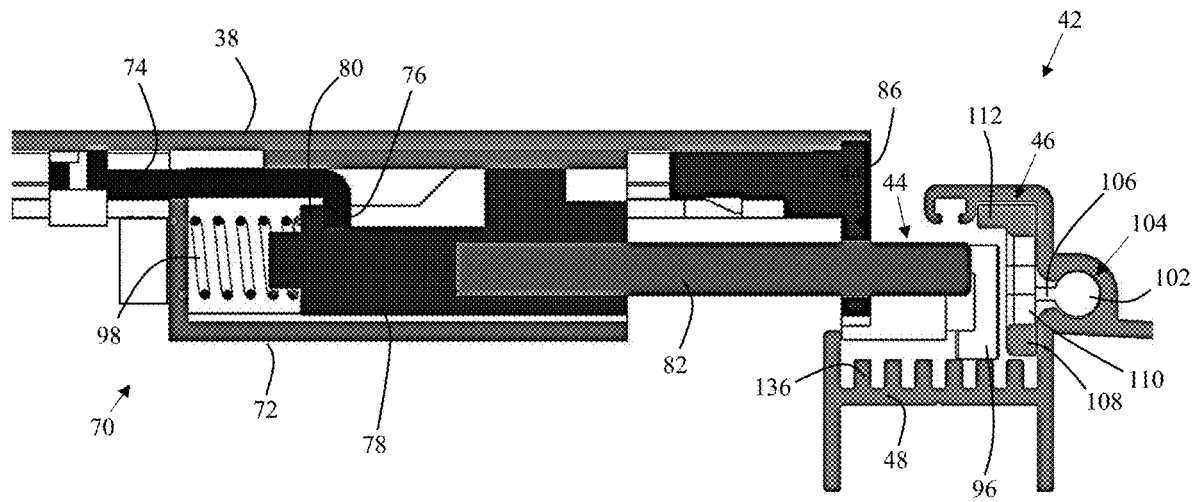
FIG. 5B is a sectional view of the spring latch of FIG. 5A in a disengaged position.

FIGS. 5A and 5B illustrate sectional views of a spring latch 70 in an engaged position and a disengaged position, respectively. As discussed above, the spring latch 70 may be secured to a tail slat 38 of the tonneau cover. As shown, the spring latch 70 may be secured along a bottom surface of the tail slat 38. As a result, the spring latch 70 along with the entirety of the release system may beneficially be located within the confines of the cargo box.

The spring latch 70 may include a housing 72 that is secured to the tail slat 38. A movable block 78 may be positioned within a cavity of the housing 72 and adapted to slide or otherwise move within the housing 72. The block 78 may moved based on articulation of an arm 74 of the spring latch 70. As discussed above, the arm 74 may be articulated based upon movement of a release latch and a release cable connecting the arm 74 and the release latch. As a result of such movement, a pin 82 of the spring latch 70 may also be articulated.

The pin 82 of the spring latch 70 may extend through an end cap 86 of the tail slat 38 to communicate with a drive system of the tonneau cover. The drive system may include a drive cable 102 secured within a drive cable channel 104 of a side rail 42. The drive cable 102 may be directly or indirectly connected to the slats of the tonneau cover, such as the tail slat 38. During operation, the drive cable 102 may be driven by a motor (not shown) to move the tonneau cover along the side rail 42. One or more bearings 96 of the tonneau cover, such as the bearing 96 connected to the end cap 86 of the tail slat 38, may be positioned within an opening 44 of the side rail 42 and may be adapted to guide the tonneau cover along ribs 136 of a support portion 48 of the side rail 42.

As shown in FIG. 5A, in the engaged position, the pin 82 of the spring latch 70 extends into a carriage 108 of the tonneau cover drive system. The pin 82 may be positioned within an opening 110 of the carriage 108 so that the carriage 108 maintains a position of the tail slat 38. The carriage 108 may maintain a position of the tail slat 38 due to the carriage 108 being connected to the drive cable 102 by an extension 106 of the drive cable 102. That is, the tonneau cover (e.g., the tail slat 38) may not move independent of the carriage 108, and the tonneau cover may only be moved based upon movement of the drive cable 102 and the carriage 108 when the spring latch 70 is in the engaged position. It should also be noted that the carriage 108 may be guided by the drive cable 102 along an upper channel 46 of the side rail 42, whereby a guiding portion 112 of the carriage 108 engages the upper channel 46.

To disengage the pin 82 from the carriage 108 as shown in FIG. 5B, a release latch (see FIG. 3) is articulated using a handle. As a release cable (not shown) secured to the arm 74 of the spring latch 70 is guided away from the side rail 42 and toward the release latch. As a result, a finger 76 of the arm 74 catches a lip 80 of the block 78, thereby moving the block 78 and the pin 82 secured therein away from the side rail 42 in the disengagement direction (PD). As a result, the pin 82 is removed from the hole 110 of the carriage 108, thereby allowing movement of the tonneau cover free of the drive system (e.g., the carriage 108 and the drive cable 102).

Conversely, when the spring latch 70 is in the disengaged as shown in FIG. 5B, the arm 74, the block 78, and the pin 82 are compressing a biasing member 98 positioned within the housing 72 of the spring latch 70. Therefore, when the release latch is released or otherwise moved to an engaged position, the arm 74 is also released and moved toward the side rail 42. As a result, the block 78 and the pin 82 are also moved towards the side rail 42 at least partially due to the biasing member 98 no longer being compressed. That is, a biasing force 98 may work in conjunction with an engaging operation of the release latch to guide the pin 82 into the hole 110 of the carriage 108, thereby resuming engagement of the tonneau cover with the drive system. Thus, it may be gleaned from the present teachings that the release system herein may advantageously allow for easy engagement and disengagement between the tonneau cover and the drive system of the tonneau cover.

Figure 6:
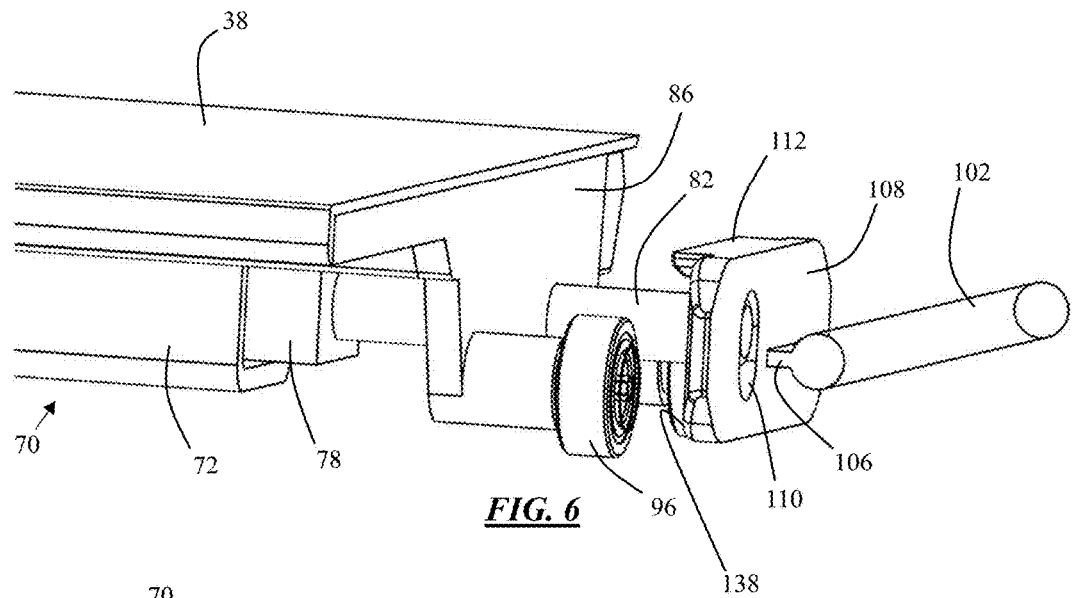
FIG. 6 is a perspective view of a spring latch and a carriage of a release system.

FIG. 6 is a perspective view of a spring latch 70 in communication with a drive system of a tonneau cover. As discussed above, the spring latch 70 may be secured along an underside of a tail slat 38 of the tonneau cover. The spring latch 70 may include a housing 72 that receives a movable block 78 within a cavity of the housing 72. A pin 82 may be secured to the block 78 and extend through an end cap 86 the tail slat 38 between or adjacent to one or more bearings 96 of the tail slat 38.

Beneficially, movement of the block 78 may in turn guide the pin 82 between an engaged position and disengaged position. In the engaged position, the pin 82 may extend into a hole 110 of the carriage 108 so that movement of the tail slat 38 and thus the tonneau cover is dictated by, or restricted by, movement of the carriage 108. The carriage 108 may further be connected to a drive cable 102 by a drive cable extension 106 so that movement of the carriage 108 is guided along a portion of the side rail by a guiding portion 112 of the carriage 108, and thus movement of the tonneau cover is based upon movement of the drive cable 102 when the spring latch 70 is in the engaged position as shown.

As discussed above, a release latch may move the pin 82 from the engaged position as shown to a disengaged position where the pin 82 is no longer positioned within the hole 110 of the carriage 108. In the disengaged position, the tonneau cover (e.g., the tail slat 38) may be moved independently of the carriage 108 and the drive cable 102 while the carriage 108 and the drive cable 102 remain stationary. Advantageously, it is envisioned that the pin 82 may be moved into the disengaged position due to a user moving a handle of the release latch. When the release latch is released, the biasing member of the spring latch 70 (see FIGS. 5A and 5B) may bias the pin 82 back into an engaged position.

As may be gleaned from the present teachings, if the tonneau cover and the spring latch 70 thereof are not properly aligned with the carriage 108, the pin 82 may extend into the side rail but not into the hole 110 of the carriage 108. To resolve any potential disconnection issues, the carriage 108 may include one or more tapered surfaces 138. The tapered surfaces 138 ensure that, if misalignment of the pin 82 and the hole 110 of the carriage 108 exists when the pin 82 is moved into the engaged position (i.e., an extended position within the side rail), the pin 82 may still be guided into the hole 110 of the carriage 108 for proper engagement. To do so, when the pin 82 is in the engaged position and moved to contact the carriage 108, the tapered surfaces 138 may act as a ramp to partially compress the biasing member of the spring latch 70 and move the pin 82 at least partially towards a disengaged position. As the pin 82 is guided along the tapered surfaces 138, the pin 82 may remain in a state of compression until the pin 82 reaches the hole 110 of the carriage 108, thereby decompressing and extending the pin 82 back into the hole 110. Thus, the tapered surfaces 138 may advantageously provide a solution to any potential disengagement conditions that may occur between the release system and the carriage 108.

Figure 7:
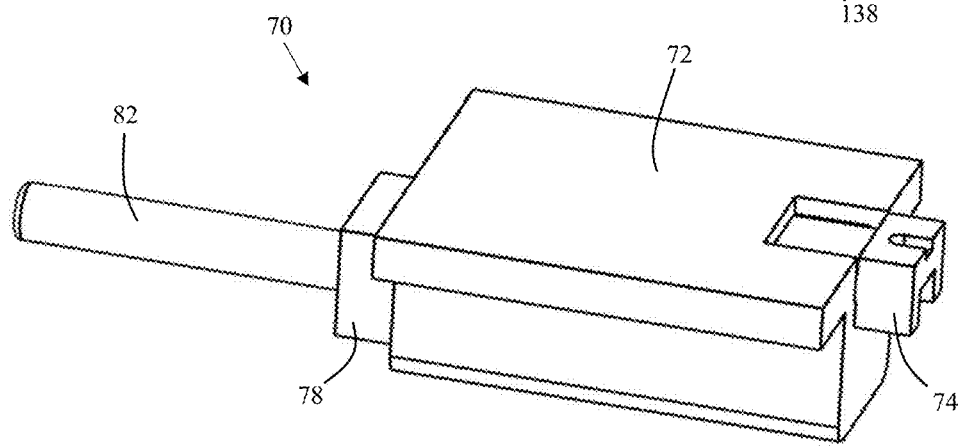
FIG. 7 is a perspective view of a spring latch of a release system.

FIG. 7 illustrates a perspective view of a spring latch 70 as discussed above. The spring latch 70 may include a housing 72. The housing 72 may be adapted to mount the spring latch 70 to a slat of a tonneau cover, such as a tail slat (see FIGS. 5A and 5B). A block 78 and an arm 74 of the spring latch 70 may be at least partially positioned within a cavity of the housing 72. The block 78 and the arm 78 may be in communication with another and may move within the housing 72 and/or outside of the housing 72 based upon articulation of a release latch of the release system (see, e.g., FIG. 4). As a result of such movement of the arm 74 and/or the block 78, a pin 82 secured to the block 78 may be moved between an engaged position and a disengaged position with respect to a drive system of the tonneau cover, such as a drive cable or a carriage secured to the drive cable.

Figure 8:
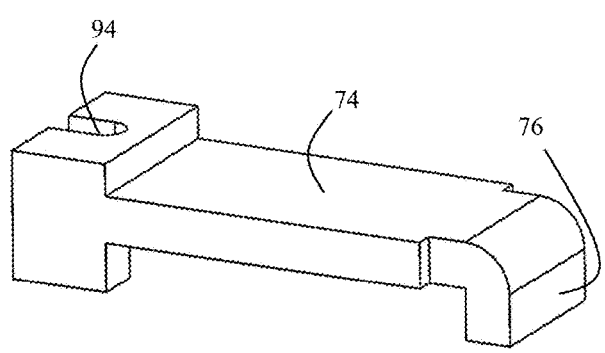
FIG. 8 is a perspective view of a spring latch arm.

FIG. 8 illustrates a perspective view of an arm 74 of a spring latch. As discussed above, the arm 74 may be in movable communication with a block of the spring latch. The arm 74 may include a finger 76 the extends or otherwise projects from a body of the arm 74. The finger 76 may extend or otherwise project to engage a lip or other feature of the block during articulation of the arm 74. For example, the arm 74 may secure a release cable within a cable hole 94 to connect the arm 74 to a release latch by the release cable. As a result, when the release latch is articulated, the arm 74 is moved. As the arm 74 moves, the finger 76 may catch the lip or other feature of the block, thereby moving the pin of the spring latch between the engaged and disengaged positions.

It should be noted that the only some movements of the arm 74 may result in engagement of the finger 76 with the block. For example, the finger 76 may only contact the block during disengagement of the pin. Conversely, the finger 76 may remain in contact with the block during substantially all of the movement of the block. That is, the finger 76 may contact the block during engagement and disengagement of the pin.

Figure 9:
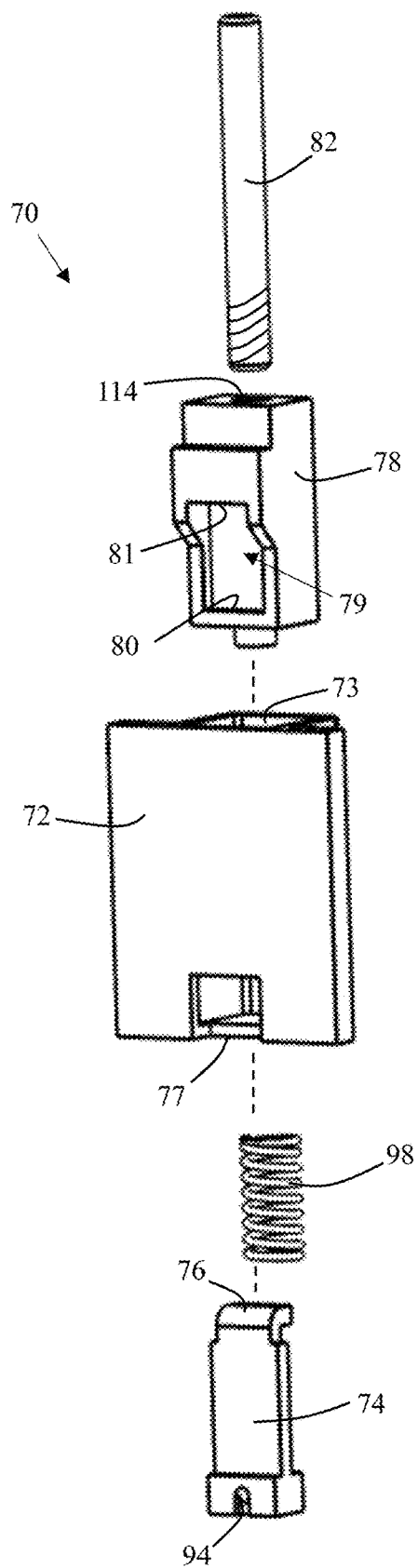
FIG. 9 is an exploded view of a spring latch of a release system.

FIG. 9 illustrates an exploded view of a spring latch 70 of the release system as described above. The spring latch 70 includes a housing 72. The housing 72 may include a cavity 72 the receives a block 78 of the spring latch 70 and at least a portion of an arm 74 of the spring latch 70. The block 78 and the arm 74 may be in movable contact and adapted to move within, and be guided by, the cavity 73 of the housing 72. As a result of such movement, a pin 82 secured within a pin hole 114 of the block 78 may be guided between a disengaged and engaged position with respect to a drive system of the tonneau cover. Additionally, the pin 82 may include threading along a portion or all of its length that may engage internal threading of the pin hole 114. As a result, the pin 82 may be secured at various locations within the pin hole 114 to adjust an overall length of the pin 82 and block 78 assembly. Therefore, the length of the pin 82 may be modified to adapt to varying widths of a tonneau cover assembly to properly engage a drive system thereof. However, it should also be noted that the pin 82 may free of threads and be secured in different manners within the block 78.

Figure 10:
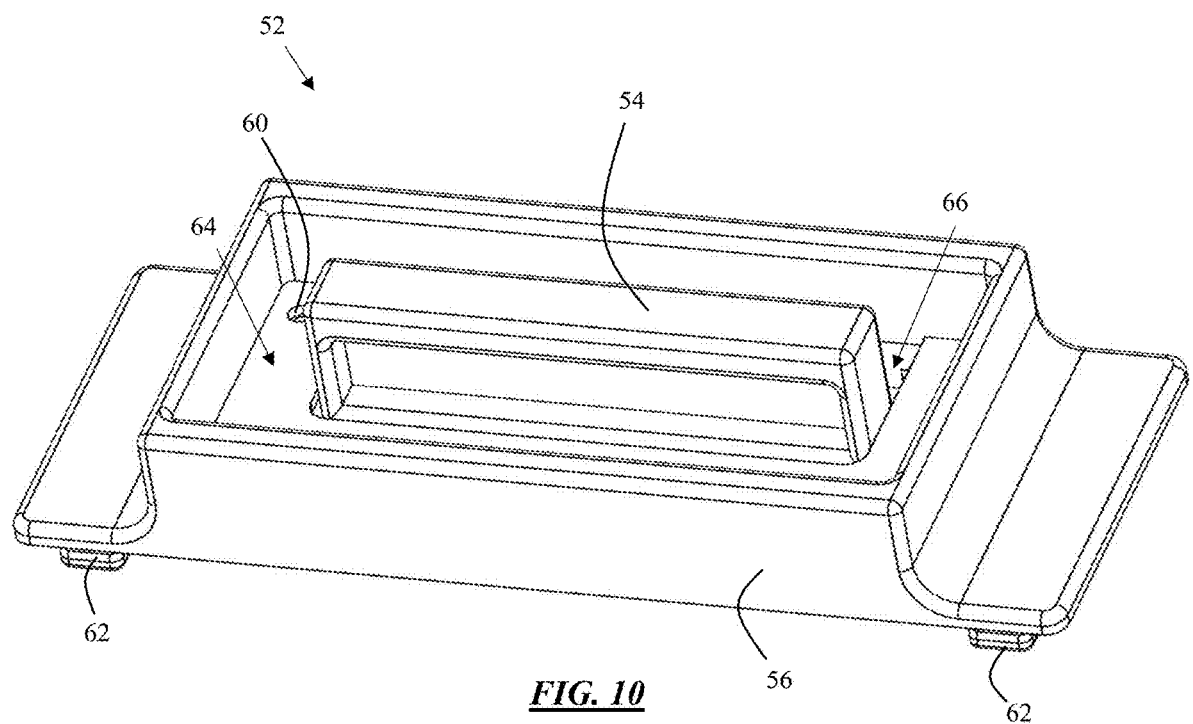
FIG. 10 is a perspective view of a release latch of a release system.

To move the pin 82 to a disengaged position, a release cable (not shown) secured within a cable hole 94 of the arm 74 may be moved by a release latch (see FIG. 10). Based upon such movement, a finger 76 of the arm 74 may catch a lip 80 of the block 78, thereby moving both the arm 74 and the block 78 in a direction away from a side rail of the tonneau cover, away from a drive system of the tonneau cover, or both. As the block 78 is moved, the pin 82 is also moved away from the drive system, thereby disengaging the pin 82 from the drive system to allow for manual movement of the tonneau cover independently of the drive system. Additionally, as the block 78 moves in the disengage direction, a biasing member 98 positioned within the housing 72 may be compressed to maintain a state of tension along the release cable.

To move the pin 82 back into an engaged position, the release latch is articulated in an engaged direction. As a result, the tension on the release cable caused by the biasing member 98 is released, thereby biasing block 78 and the pin 82 back in the engaged direction towards the drive system of the tonneau cover, the side rail of the tonneau cover, or both. The biasing member 98 may push the block 78 and the arm 74 secured to the lip 80 of the block 78 by the finger 74 in the engaged position until the arm 74 reaches a stop 77 of the arm 74. The stop 77 of the arm 74 may be a wall of the housing 72 that a portion of the arm 74 abuts in the final engaged position, thereby preventing over-extension of the spring latch 70 or components therein.

As discussed above, the drive system may allow for at least partial retraction of the pin 82 in the disengaged position to accommodate for misalignment between the pin 82 and the drive system. For example, the carriage may include a tapered surface to act as a ramp and at least partially move the pin 82 in the disengaged position along the tapered surface before the pin 82 reach the hole of the carriage, thereby allowing the biasing member 98 to move the block 78 and thus the pin 82 into the hole of the carriage.

During such partial retraction, the pin 82 and the block 78 may move substantially independently from the arm 74. As a result, the finger 76 of the arm 74 may disengage the lip 80 of the block 78 to allow the block 78 to move towards the finger 74 and decrease a distance between the finger 74 and the block 78. During this type of retraction, the finger 76 may be guided within a receiving portion 79 of the block 78. The receiving portion 79 may also include a stop 81 to stop the block 78 when the stop 81 reaches the finger 76 of the arm 74. Thus, the stop 81 and the receiving portion 79 thereof may advantageously prevent misalignment between the arm 74 and the block 78 yet still allow for movement of the block 78 independently of the arm 74 when needed for proper engagement between the spring latch 70 and the drive system of the tonneau cover. Additionally, once the pin 82 is moved back into the engaged position, the finger 76 will once again catch the lip 80 of the block 78 to allow for future articulation of the spring latch 70 by the release latch.

FIG. 10 illustrates a perspective view of a release latch 52 of a release system in accordance with the present teachings. The release latch 52 may include a movable handle 54 positioned within a depression 64 of a casing 56. As shown, an upper surface of the handle 54 may be substantially flush with an upper edge of the depression 64. However, the handle 54 may also be recessed from, or protrude from, the upper edge of the depression 64. The casing 56 may be adapted to at least partially secure the release latch 52 to a slat of the tonneau cover—such as a tail slat—by a plurality of feet 62 along a bottom surface of the casing 56. The feet 62 may include a keying portion or engaging portion to engage a receiving portion or keyhole of the slat.

The handle 64 may be adapted to moved within a handle slot 66 between an engaged position and a disengaged position (see FIGS. 11A and 11B), whereby the release latch 52 may be in communication with a spring latch to engage and/or disengage the spring latch from a drive system of the tonneau cover. As discussed in further detail below, movement of the handle 54 may in turn articulate one or more internal components of the release latch 52 located along a base plate (not shown) that communicate with the spring latch. Furthermore, the casing 56 may be secured to the base plate or the slat of the tonneau cover using one or more fasteners extending through casing holes 60 positioned within the depression 64.

Figure 11A:
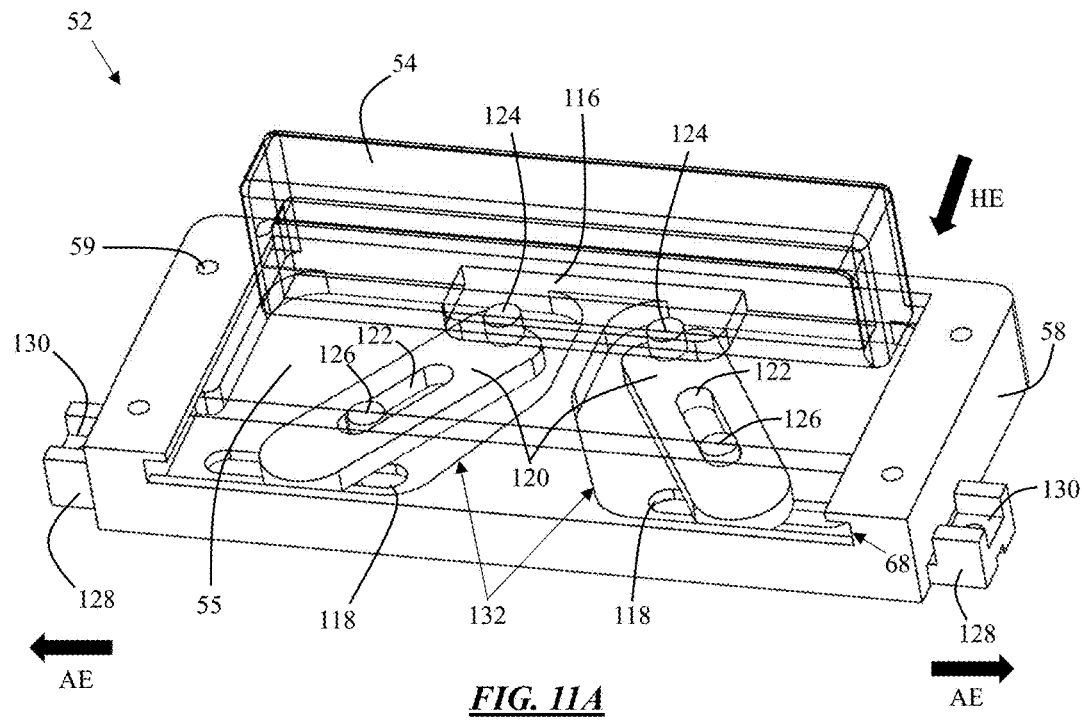
FIG. 11A is a perspective view of a release latch in a disengaged position.
Figure 11B:
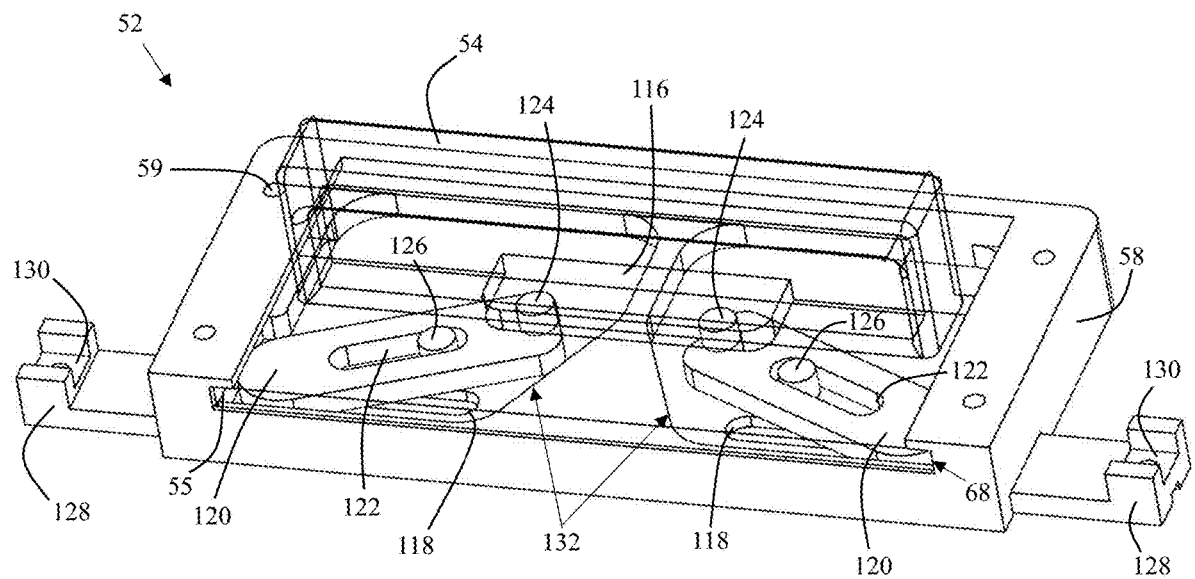
FIG. 11B is a perspective view of the release latch of FIG. 11A in an engaged position.

FIGS. 11A and 11B illustrate perspective views of a release latch 52 in a disengaged position and an engaged position, respectively. The disengaged position of the release latch 52 may correspond to a disengaged position of the spring latch, whereby the pin of the spring latch is free of engagement with the drive system of the tonneau cover (see FIG. 5B). The engaged position of the release latch 52 may correspond to an engaged position of the spring latch, whereby the pin of the spring latch engages the drive system of the tonneau cover (see FIG. 5A).

The casing of the release latch 52 as shown in FIG. 10 has been removed for clarity. Additionally, a handle 54 and a handle base 55 are shown as transparent for illustrative purposes to show the internal components of the release latch 52 more clearly.

The handle 54 may be secured to a handle base 55. The handle base 55 may be adapted to move within a channel 68 of a base plate 58 to move a plurality of links 120 located on or within the base plate 58. Movement of the handle 52 may move the links 120 to in turn move one or more pull arms 128 of the release latch 52. The pull arms 128 may be configured to extend and/or retract from the base plate 58 to move one or more release cables secured to cable holes 130 of the pull arms 128 that are also secure to the spring latches, thereby articulating the spring latches between the engaged position and the disengaged position.

As shown in FIG. 11A, the release latch 52 is in a disengaged position, whereby the pull arms 128 abut an outer surface or are otherwise located near the outer surface of the base plate 58. It should also be noted that the pull arms 128 may be movable to extend beneath or beyond the casing (not shown) that may be secured to the base plate 58 via base plate holes 59 that align with casing holes (see FIG. 10).

During articulation from the disengaged position (FIG. 11A) to the engaged position (FIG. 11B), the handle 54 and the handle base 55 may be moved in the handle engagement direction (HE) along the channel 68 of the base plate 58. During movement, a handle track 116 located within the handle base 55 engages link buttons 124 positioned at least partially within the handle track 116. As a result of the engagement, the handle track 116 moves the link buttons 124, which in turn moves the links 120 connect to the link buttons 124. The links 120 are guided by the handle 54 along base plate tracks 132 to move the pull arms 128 connected to the links 120. The links 120 may also slide along a base plate button 126 positioned within a slot 122 of the link 120 due to movement of the handle 54. As the links 20 move along the track 132 of the base plate 58, the pull arms 128 are guided along slots 118 in the base plate 58 due to a button of the pull arms 128 extending through the slots 118 of the base plate 58 to engage the links 120 (see FIG. 12). That is, the pulls arms 128 may move in the engagement direction (AE) when the handle 54 is moved in the engagement direction (HE) to extend away from the base plate 58, as shown in FIG. 11B.

To move from the engaged position as shown in FIG. 11B to the engaged position in FIG. 11A, the handle 54 is moved in an opposing direction to that of (HE), thereby once again engaging the links 120 to move the pull arms 130 in an opposing direction to that of (AE) until the pull arms 130 are positioned adjacent to the base plate 58.

Figure 12:
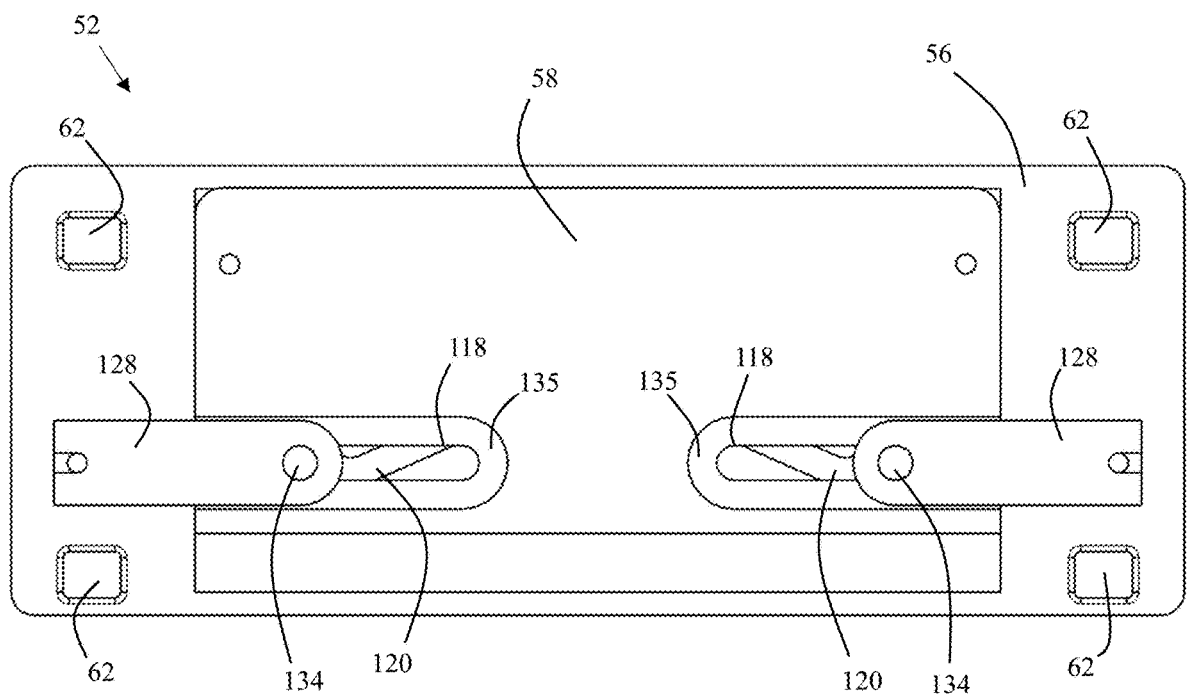
FIG. 12 is a bottom view of a release latch of a release system.

FIG. 12 illustrates a bottom view of a release latch 52. As mentioned above, the release latch 52 may include a base plate 58 at least partially positioned within a casing 56. The casing 56 may be secured to a slat by one or more feet 62 of the casing 56.

The release latch 52 may also include a handle (see FIGS. 11A and 11B) that moves pull arms 128 along grooves 135 of the base plate 38. The handle may move links 120 along an opposing surface of the base plate 38 to in turn move the pull arms 128 connected to the links 120 by pull arm buttons 134 extending through slots 118 of the base plate 38 to engage the links 120. It should also be noted that the pull arms 128 may be at least partially covered by the casing 56 during operation yet still allow for a release cable to extend between the pull arms 128 and the spring latches 70.

Figure 13:
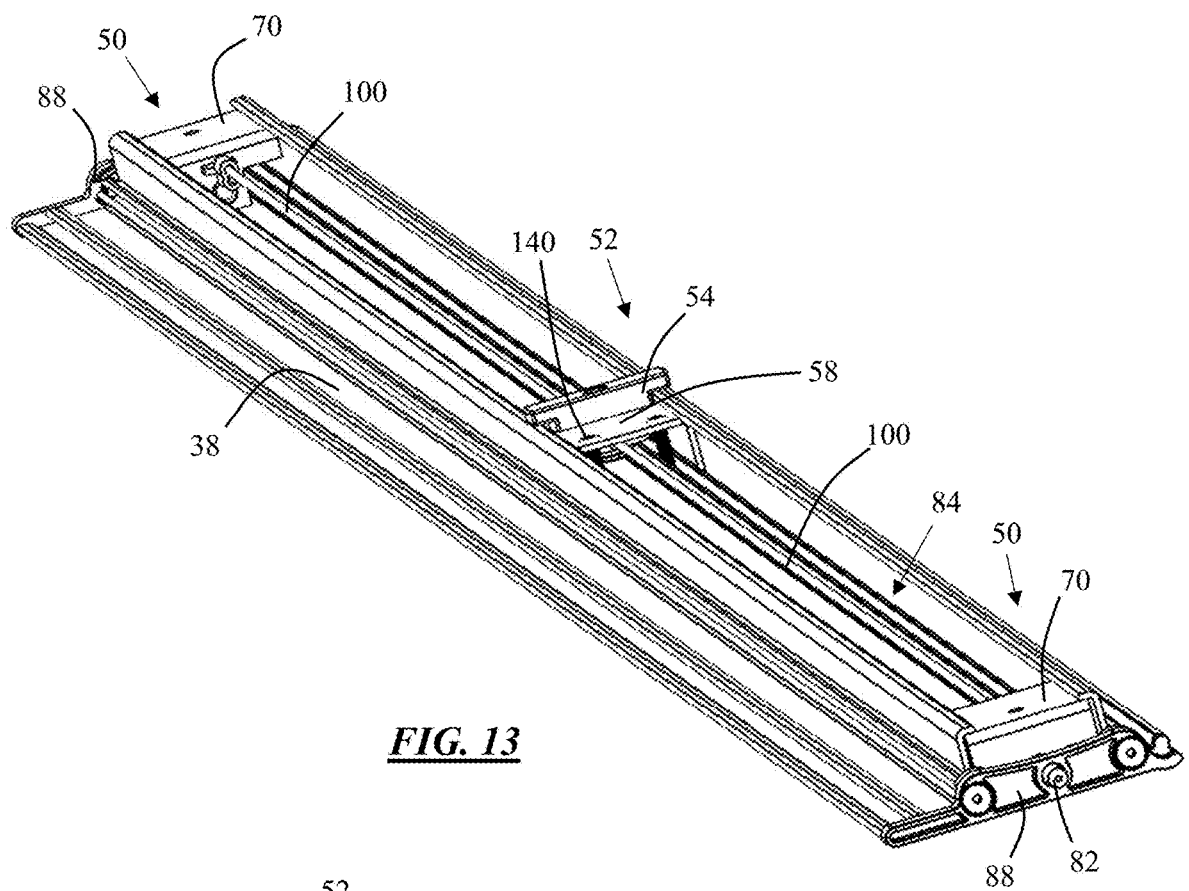
FIG. 13 is a perspective view of a tail slat of a tonneau cover having a release system.

FIG. 13 illustrates a perspective bottom view of a tail slat 38. The tail slat may include a release system 50 in accordance with the present teachings. The release system 50 may be configured to disengage the tail slat 38, or one or more additional slats of a tonneau cover, or a combination thereof from a drive system of the tonneau cover (see, e.g., FIG. 6). As mentioned above, the tonneau cover may be drive by one or more cables in communication with a motor.

The release system as shown in FIG. 13 may provide a means to manually disengage the tail slat 38 or additional slats from the drive system. That is, in case of power outages or other deficiencies which render the drive system inoperable, a user may still manually open (e.g., retract), manually close (e.g., extend), or both the tonneau cover.

To release the tail slat 38 shown in FIG. 13 from the drive system, a user may grasp a handle 54 of a release latch 52. The handle 54 may be rotated (see FIG. 14) to articulate opposing spring latches 70 of the release system 50 that are in communication with the release latch 52 by a release cable 100. The spring latches 70 may be positioned near opposing ends of the tail slat 38 such that movement of the handle 52 may engage and/or disengage a pin 82 of the spring latches 70 from the drive system. The pin 82 of the spring latches 70 may also extend through end caps 88 of the tail slat 38. Furthermore, the release latch 52, the spring latches 70, the release cable 100, or a combination thereof may be contained within a channel 84 of the tail slat 38. As a result, the release system 50 may be at least partially or entirely contained within the confines of the tail slat 38, thereby decreasing additional packaging space needed within a cargo box of a vehicle for the release system 50.

While the details above describe releasing of the drive system using the handle 54 of the release latch 52, it is envisioned that additional release mechanisms may be incorporated into the release latch 52 or may be in communication with the release latch 52. For example, the handle 54 of the release latch 52 may be located along a bottom side of the tail slat 38 such that, when the tonneau cover is disposed over a cargo box of a vehicle, the handle 54 may be contained within the confines of the cargo box. As a result, the handle 54 may be inaccessible from an outer surface of the tail slat 38, thereby providing further security for unwanted release of the drive system.

However, if a user were to desire an additional means of releasing the drive system using the release latch 52 without needing to access the cargo box of the vehicle (i.e., by opening a tailgate of the vehicle or additional access panel of the tonneau cover), the release latch 52 may also include a release means along an outer surface of the tail slat 38. For example, the release latch 52 may include a key cylinder or tumbler extending through the tail slat 38 along an outer surface of the tail slat 38. As a result, a user may be able to insert a key into the key cylinder and turn the release latch 52 with the key as opposed to the handle 54, thereby allowing for release of the drive system without accessing the confines of the cargo box. It should also be noted that while a key cylinder is described herein any mechanism, such as an additional handle, knob, key tumbler, latch, etc., may also be present in addition to, or in lieu of, the key cylinder described above.

Figure 14:
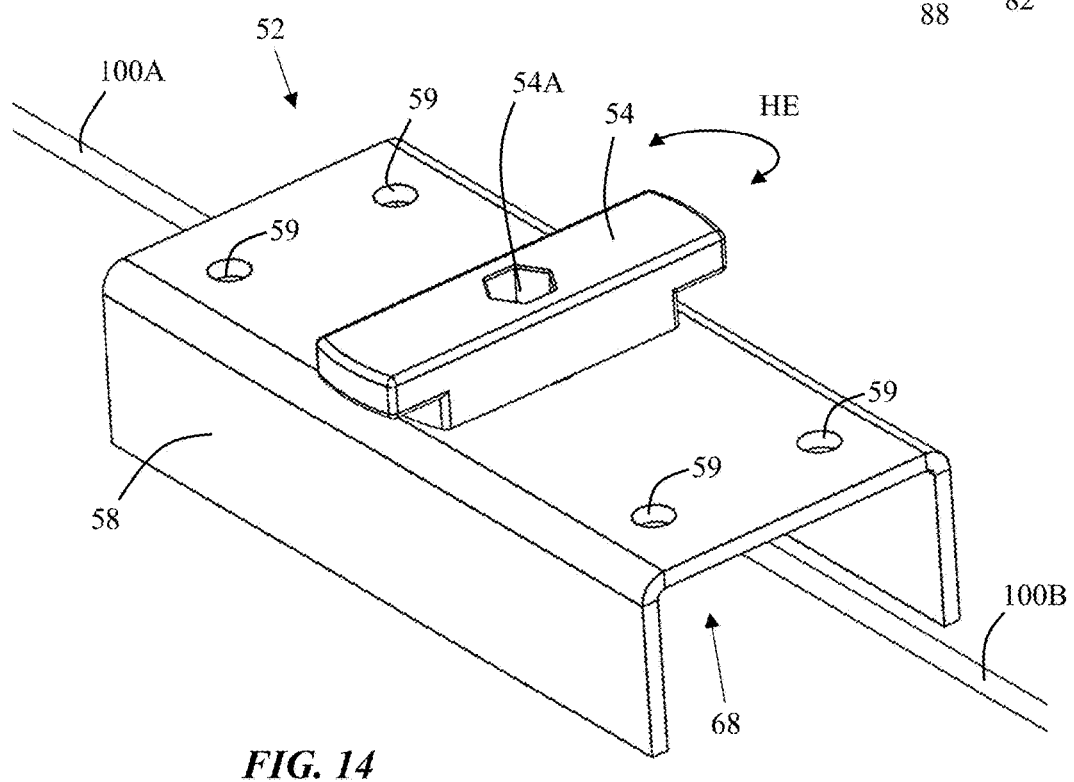
FIG. 14 is a perspective view of a release latch of a release system.

FIG. 14 illustrates a perspective view of a release latch 52. Such a release latch 52 may be adapted for use with the release system shown in FIG. 13. However, it is envisioned that the release latch 52 may also be integrated into a variety of systems or could be used as a standalone mechanism.

The release latch 52 may include a handle 54 rotatable engaged to a release cable 100 of the release system. The handle 54 may extend through a base plate 58 of the release latch 52 so that the release cable 100 may be routed through a portion of the handle 54. It should be noted that the release cable 100 may be a single, unitary cable extending through the release latch 52 or may be a first release cable 100A and a second release cable 100B converging and both connecting to the release latch 52, whereby the first and second release cables 100A,100B may extend to opposing spring latches of the release system. Moreover, the base plate 58 may also include one or more hole 59 adapted to mount the release latch 52 within a channel of slat, such as the tail slat shown in FIG. 13.

To articulate the release latch 52 and engage the first cable 100A and/or the second cable 100B, a user may rotate the handle 54 in an engagement direction (HE). In doing so, the handle 54 may exert tension on the first cable 100A and/or the second cable 100B, whereby the first cable 100A and/or the second cable 100B may be at least partially around a portion of the handle 54 located within a channel 68 of the base plate 58. As a result, the cables 100A, 100B may pull on a respective spring latch so release the spring latch from the drive system of the tonneau cover. Advantageously, the handle 54 may also include a keyhole 54A. The keyhole 54A may be any desired size and/or shape. However, it is envisioned that the keyhole 54A may be adapted to receive a tool (e.g., a hex key, wrench, screwdriver, drill bit, etc.) so that the tool may move the handle 54 and the engagement direction 54, thereby providing additional force as necessary to release the release system from the drive system. Once articulation is completed, the handle 54 may be biased to return to an original position (e.g., a disengaged position). However, the handle 54 may also be free of any biasing, whereby a user may manually return the handle 54 to the disengaged position.

Figure 15:
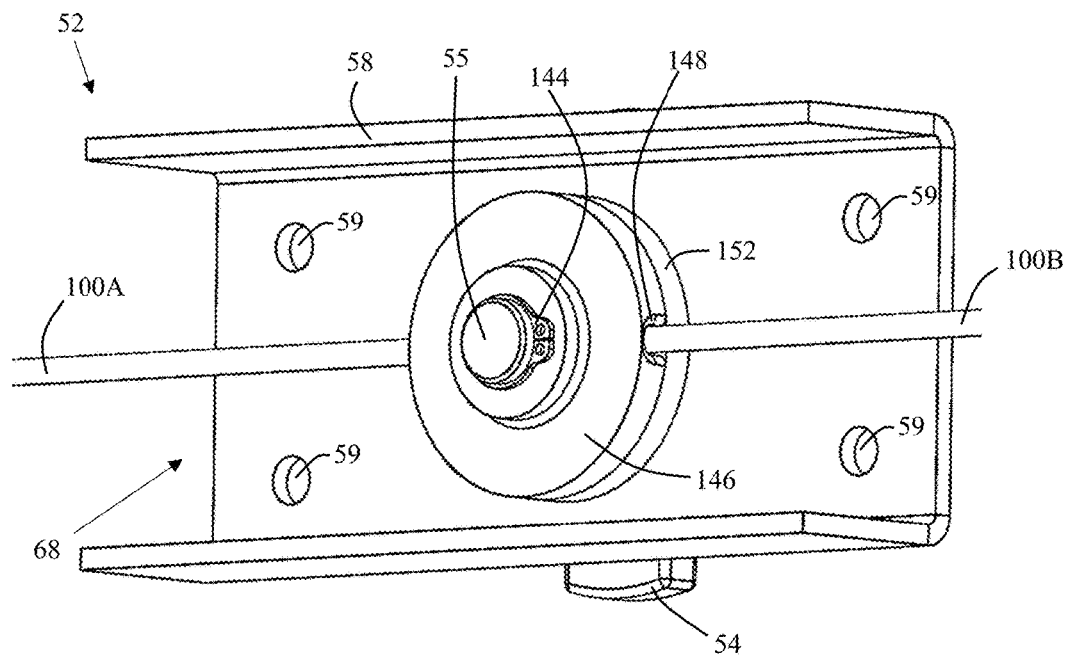
FIG. 15 is a perspective view of a release latch of a release system.

FIG. 15 illustrates an additional perspective view of a release latch 52. As mentioned above, the release latch 52 may include a handle 54 in communication with a base plate 58. The handle 54 may extend through the base plate 58 so that a first cable or first cable portion 100A and a second cable or second cable portion 100B are routed through a handle base 55 of the handle 54. To facilitate routing and rotation of the handle 54, a cam 146 may be secured to the base 55 of the handle 54, whereby the first and/or second cables or cable portions 100A, 100B are routed through a notch 148 of the cam 146. The cam 146 may also be spaced apart from the base plate 58 within a channel 68 of the base plate 58 by a spacer 152. As a result, the cam 146 and the spacer 152 may be secured to the handle 54 and the base plate 58 by a retaining clip 144. Moreover, the base plate 58 may include a plurality of holes 59 that may receive fasteners to secure the release latch 52 to a tail slat (see, e.g., FIG. 13).

Figure 16:
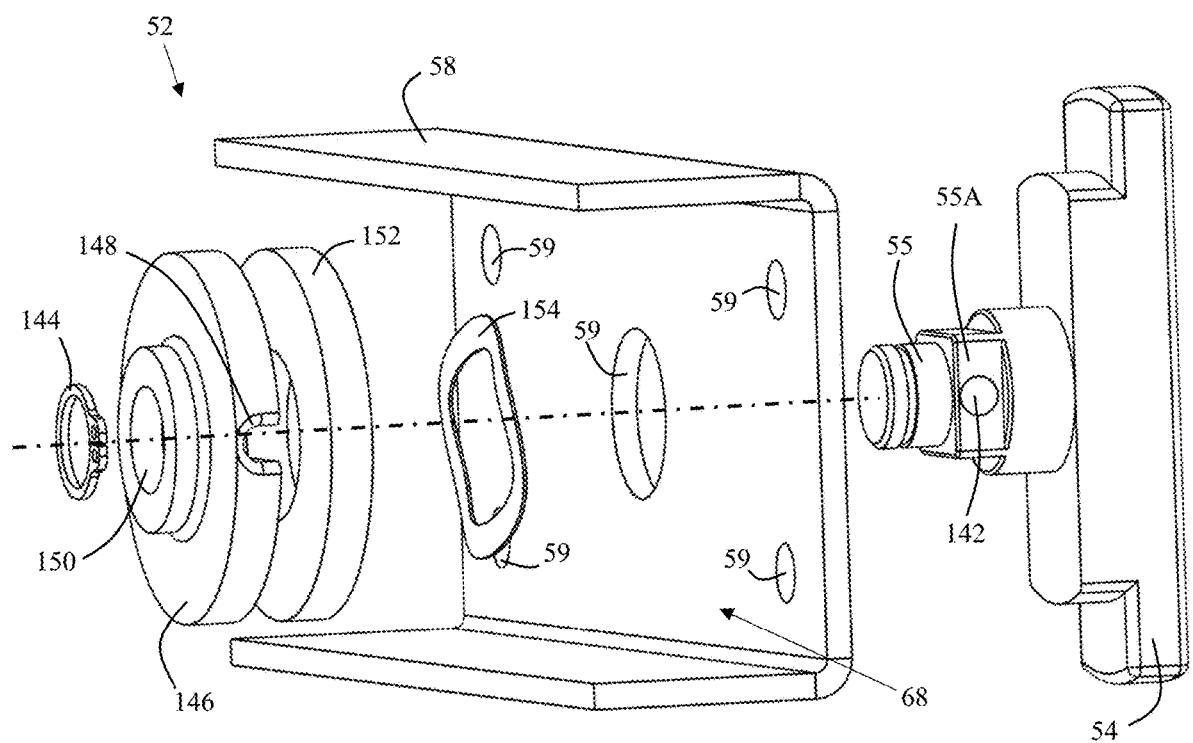
FIG. 16 is an exploded view of the release latch shown in FIG. 14.

FIG. 16 illustrates a perspective view of a release latch 52. The release latch may include a handle 54. The handle 54 may include a base 55 projecting or otherwise extending from the handle 54 that is adapted to extend through a hole 59 of a base plate 58. The base 55 of the handle 54 may also include an engaging portion 55A adapted to engage a cam 146 of the release latch 52. The engaging portion 55A may include a receiving hole 142 that receives and routs the release cable of the release system (see FIG. 15). As a result of the engaging portion 55A engaging the cam 146, rotation of the handle 54 also results in rotation of the cam 146, whereby the base 55 of the handle 55 at least partially extends through an opening 150 of the cam 146.

The cam 146 may be located within a channel 68 of the base plate 58 so that release cable of the release system extends through a notch 148 of the cam 146 into the engaging portion 55A of the base 55 of the handle 54. The cam 144 may also be spaced apart from a surface of the base plate 58 located within the channel 68 by a spacer 152, a washer 154, or both. However, a spacer 152 and/or a washer 154 may not be necessary for securing the cam 146 to the handle 54 and/or the base plate 58. Lastly, the washer 154, the spacer 152, and the cam 146 may be secured to the base 55 of the handle 54 by a retaining clip 144. Moreover, the base plate 58 may include a plurality of holes 59 that may receive fasteners to secure the release latch 52 to a tail slat (see, e.g., FIG. 13).

Figure 17:
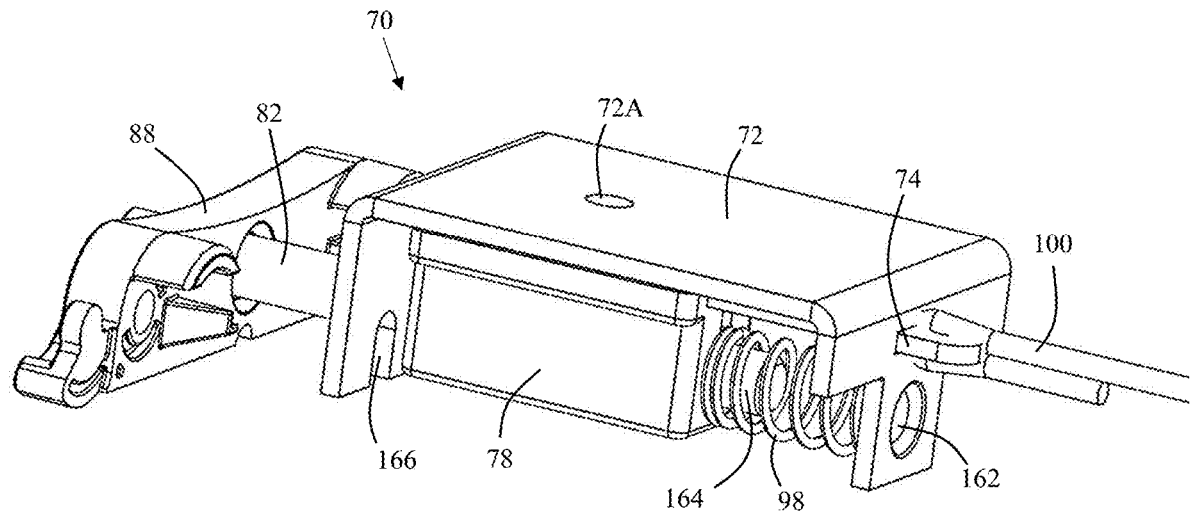
FIG. 17 is a perspective view of a spring latch of a release system.

FIG. 17 illustrates a perspective view of a spring latch 70 of a release system in accordance with the present teachings. Such a spring latch 70 may be adapted for use with the release system shown in FIG. 13. However, it is envisioned that the spring latch 70 may also be integrated into a variety of systems or could be used as a standalone mechanism.

The spring latch 70 may include a housing 72 having an opening 72A, whereby the housing 72 is adapted to be mounted within a tail slat of a tonneau cover system. For example, one or more fasteners may extend through notches 166 within the housing 72 to secure the spring latch 70 to the tail slat, an end cap 88 of the tail slat, or both.

A movable block 78 may be positioned within a cavity or channel of the housing 72. The movable block 78 may be adapted to slide or otherwise move within the housing 72. The block 78 may be moved based on articulation of an arm 74 of the spring latch 70. The arm 74 may be connected to a release cable 100 of the release system so that, when the release cable is articulated (e.g., by a release latch or other mechanism), the release cable 100 exerts a pulling force on the arm 74. As the release cable 100 pulls the arm 74, the arm 74 in turn may move the block 78 and a pin 82 connected thereto to allow the pin 82 to release from a drive system of the tonneau cover. As shown, the pin 82 may also be routed through the end cap 88 of a tail slat (not shown).

The spring latch 70 may also include a biasing member 98 extending between a retaining feature 164 of the block 78 and a dimple 162 of the housing 72. As a result, when the finger 74 and thus the block 78 are moved in a disengaging direction, the biasing member 98 may be placed under tension. When the finger 74 is released by the release cable 100 (i.e., the release cable is no longer under tension), the biasing member 98 may bias the finger 74 and thus the block 78 back to its original position (i.e., an engaged position).

Figure 18:
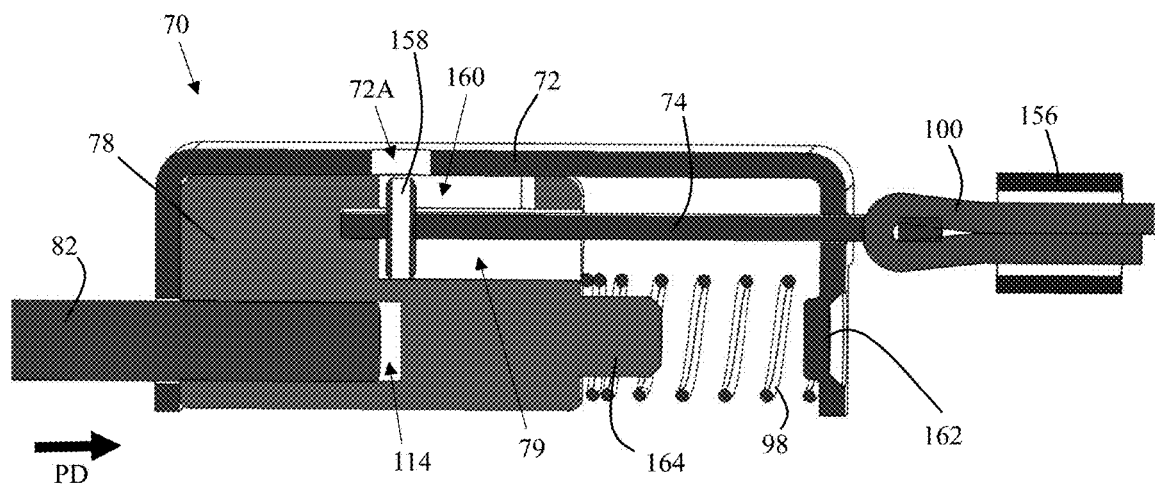
FIG. 18 is a sectional view of the spring latch of FIG. 17.

FIG. 18 illustrates a sectional view of the spring latch 70 shown in FIG. 17. As discussed above, the spring latch 70 may include a housing 72 having an opening 72A. A movable block 78 may be positioned within a cavity or channel of the housing 72. The movable block 78 may be adapted to slide or otherwise move within the housing 72. The block 78 may be moved based on articulation of an arm 74 of the spring latch 70. The arm 74 may be secured within a receiving portion 79 of the block 78 by a spring pin 158 viewable through the hole 72A of the housing 72. The arm 74 may be connected to a release cable 100 of the release system by a crimp 156 so that, when the release cable is articulated, the release cable 100 may pull the arm 74 in a disengaging direction. As the release cable 100 pulls the arm 74, the arm 74 in turn may move the block 78 and a pin 82 located within a pin hole 114 of the block 78 o to allow the pin 82 to release from a drive system of the tonneau cover in the disengagement direction (PD). For example, the finger 74 may move in the disengaging direction until the spring pin 158 reaches an end of the slot 160 within the block 78, at which point the block 78 may also begin to move in the disengaging direction.

The spring latch 70 may also include a biasing member 98 extending between a retaining feature 164 of the block 78 and a dimple 162 of the housing 72. As a result, when the finger 74 and thus the block 78 are moved in a disengaging direction, the biasing member 98 may be placed under tension. When the finger 74 is released by the release cable 100 (i.e., the release cable is no longer under tension), the biasing member 98 may bias the finger 74 and thus the block 78 back to its original position (i.e., an engaged position).

ELEMENT LIST

20 Vehicle
22 Cargo Box
24 Tailgate
26 Tonneau Cover
28 Canister
30 Inside Panel
32 Outer Fender
34 Bed Cap
36 Slat
38 Tail Slat
40 Front Panel
42 Side Rail
44 Side Rail Opening
46 Upper Channel
48 Support Portion
50 Release System
52 Release Latch
54 Handle
54A Keyhole of the Handle
55 Handle Base
55A Engaging Portion of the Handle Base
56 Casing
58 Base Plate
59 Base Plate Hole
60 Casing Hole
62 Foot of the Casing
64 Depression of the Casing
66 Handle Slot
68 Base Plate Channel
70 Spring Latch
72 Housing
72A Opening of the Housing
73 Housing Cavity
74 Spring latch Arm
76 Finger
77 Stop of the Finger
78 Block
79 Receiving Portion of the Block
80 Lip of the Block
81 Stop of the Block
82 Pin
84 Channel of the Slat
86 Keyhole of the Channel
88 End Cap of the Slat
90 Clip
92 Clip Hole
94 Cable Hole
96 Bearing
98 Biasing Member
100 Release Cable
100A First Portion of the Release Cable
100B Second Portion of the Release Cable
102 Drive Cable
104 Drive Cable Channel
106 Drive Cable Extension
108 Carriage
110 Carriage Opening
112 Guiding Portion
114 Pin Hole
116 Handle Track
118 Slot of the Base Plate
120 Link
122 Link Slot
124 Link Button
126 Base Plate Button
128 Pull Arm
130 Cable Hole of the Pull Arm
132 Base Plate Track
134 Pull Arm Button
135 Base Plate Groove
136 Rib
138 Tapered Surface of the Carriage
140 Fastener
142 Receiving Hole of the Handle
144 Retaining Clip of the Release Latch
146 Cam of the Release Latch
148 Notch of the Cam
150 Opening of the Cam
152 Spacer
154 Washer
156 Crimp of the Release Cable
158 Spring Pin
160 Slot of the Block 162 Dimple of the Housing
164 Retaining Feature of the Block
166 Notch of the Housing
PD Direction of Disengagement of the Pin
AE Direction of Engagement of the Pull Arm
HE Direction of Engagement of the Handle
Do Direction of Opening of the Tonneau Cover
Dc Direction of Closing of the Tonneau Cover The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

The disclosures of all articles and references, including patent applications and publications, are incorporated by reference in their entirety for all purposes. Other combinations are also possible as will be gleaned from the following claims, which are also hereby incorporated by reference in their entirety into this written description.

What is claimed is:

1. A release system of a tonneau cover, the release system comprising:
   (a) a spring latch, wherein the spring latch is located adjacent to or at least partially within an opening of a side rail of the tonneau cover to engage a drive system of the tonneau cover located within the side rail; and
   (b) a release latch connected to the spring latch by a release cable so that articulation of the release latch moves the spring latch between an engaged position, where the spring latch engages the drive system, and a disengaged position, where the spring latch is free of engagement with the drive system and the tonneau cover is free to move along the side rail independently of the drive system, wherein the spring latch and the release latch are both secured to a slat of the tonneau cover, and the release latch is positioned centrally along a length of the slat, and the spring latch is located near an end of the slat.

2. The release system of claim 1, wherein the slat is a tail slat.

3. A release system of a tonneau cover, the release system comprising:
   (a) a spring latch, wherein the spring latch is located adjacent to or at least partially within an opening of a side rail of the tonneau cover to engage a drive system of the tonneau cover located within the side rail; and
   (b) a release latch connected to the spring latch by a release cable so that articulation of the release latch moves the spring latch between an engaged position, where the spring latch engages the drive system, and a disengaged position, where the spring latch is free of engagement with the drive system and the tonneau cover is free to move along the side rail independently of the drive system, wherein the spring latch includes a movable pin that engages a carrier of the drive system, whereby the carrier is secured to a drive cable routed through the side rail.

4. The release system of claim 3, wherein the pin of the spring latch is positioned within a hole of the carrier in the engaged position and the pin of the spring latch is retracted from the hole of the carrier in the disengaged position.

5. The release system of claim 3, wherein the spring latch comprises:
   (a) a housing that secures the spring latch to a slat of the tonneau cover;
   (b) a block movably positioned within a cavity of the housing, wherein the pin is secured to the block so that movement of the block also moves the pin; and
   (c) an arm connected to the release latch by the release cable, wherein movement of the arm is driven by articulation of the release latch and movement of the arm moves the block.

6. The release system of claim 5, wherein the arm includes a finger or a spring pin that engages the block so that movement of the arm also moves the block.

7. The release system of claim 6, wherein the spring latch includes a biasing member positioned within the cavity of the housing that is compressed by the block in the disengaged position.

8. The release system of claim 7, wherein the biasing member biases the block and the pin towards the drive system of the tonneau cover.

9. The release system of claim 5, wherein the release latch comprises:
(a) a base plate;
(b) a movable handle extending through the base plate, wherein the handle is connected to the release cable so that articulation of the handle moves the spring latch between the engaged position and the disengaged position.

10. The release system of claim 9, wherein the articulation of the handle moves a cam secured to a base of the handle, and the cable is routed through the cam and connect to the base of the handle.

11. The release system of claim 10, wherein the base of the handle includes an engaging portion that engages the cam so that movement of the handle moves the cam.

12. The release system of claim 11, wherein the engaging portion of the base includes an anti-rotation feature.

13. The release system of claim 9, wherein the handle is secured to the base plate by a retaining clip.

14. The release system of claim 9, wherein the spring latch and the release latch are both secured to a tail slat of the tonneau cover.

15. The release system of claim 14, wherein the drive cable of the drive system is routed through the side rail that supports the tonneau cover.

16. The release system of claim 15, wherein the carrier of the drive cable located within the side rail includes one or more tapered surfaces to guide the pin to the engaged position where the pin is located in a hole of the carrier.

17. A spring latch adapted to engage a drive system of a tonneau cover, the spring latch comprising:
(a) a housing;
(b) a block movably positioned within a cavity or channel of the housing;
(c) a pin secured to the block so that movement of the block also moves the pin, wherein the pin engages a carrier of the drive system, whereby the carrier is secured to a drive cable of the drive system; and
(d) an arm, wherein movement of the arm moves the block.

* * * * *